US011516433B1

(12) United States Patent
Yan et al.

(10) Patent No.: US 11,516,433 B1
(45) Date of Patent: Nov. 29, 2022

(54) REPRESENTATION AND COMPRESSION OF GALLERY VIEW FOR VIDEO CONFERENCING

(71) Applicant: Plantronics, Inc., Santa Cruz, CA (US)

(72) Inventors: Yong Yan, Leander, TX (US); Stephen C. Botzko, Reading, MA (US); Jian David Wang, Burnaby (CA)

(73) Assignee: PLANTRONICS, INC., Santa Cruz, CA (US)

( * ) Notice: Subject to any disclaimer, the term of this patent is extended or adjusted under 35 U.S.C. 154(b) by 0 days.

(21) Appl. No.: 17/446,266

(22) Filed: Aug. 27, 2021

(51) Int. Cl.
*H04N 7/15* (2006.01)
*H04L 65/80* (2022.01)
*H04L 65/65* (2022.01)
*H04L 65/70* (2022.01)

(52) U.S. Cl.
CPC ............. *H04N 7/15* (2013.01); *H04L 65/65* (2022.05); *H04L 65/70* (2022.05); *H04L 65/80* (2013.01)

(58) Field of Classification Search
CPC .................................. H04N 7/15; H04N 7/147
USPC ............................................. 348/14.01–14.16
See application file for complete search history.

(56) References Cited

U.S. PATENT DOCUMENTS

| | | | | |
|---|---|---|---|---|
| 2008/0002045 A1* | 1/2008 | Wallach | ................ | H04N 7/185 348/311 |
| 2010/0103245 A1* | 4/2010 | Decker | .................. | H04N 7/142 348/14.09 |
| 2018/0063482 A1* | 3/2018 | Goesnar | ............... | G06V 40/166 |
| 2020/0344278 A1* | 10/2020 | Mackell | ................. | H04N 7/147 |

* cited by examiner

*Primary Examiner* — Melur Ramakrishnaiah
(74) *Attorney, Agent, or Firm* — Lindauer Law, PLLC

(57) ABSTRACT

The development of a region of interest (ROI) video frame that includes only ROIs of interest and not other elements and providing the ROI video frames in a single video stream simplifies the development of gallery view continuous presence displays. ROI position and size information metadata can be provided or subpicture concepts of the particular codec can be used to separate the ROIs in the ROI video frame. Metadata can provide perspective/distortion correction values, speaker status and any other information desired about the participant or other ROI, such as name. Only a single encoder and a single decoder is needed, simplifying both transmitting and receiving endpoints. Only a single video stream is needed, reducing bandwidth requirements. As each participant can be individually isolated, the participants can be provided in similar sizes and laid out as desired in a continuous presence display that is pleasing to view.

18 Claims, 19 Drawing Sheets

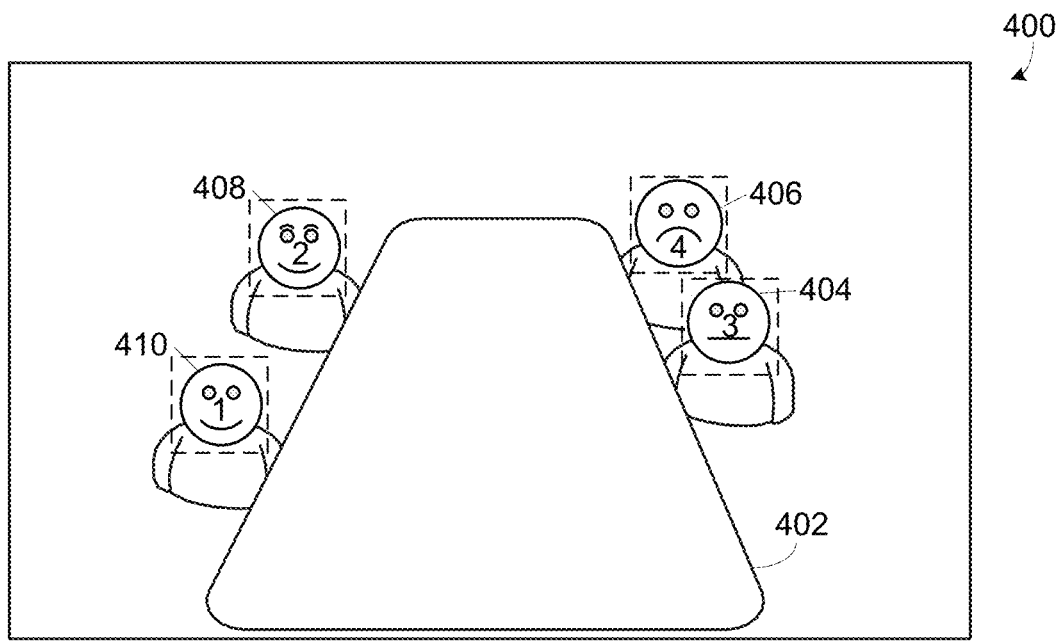
FIG. 3A
FIG. 3B
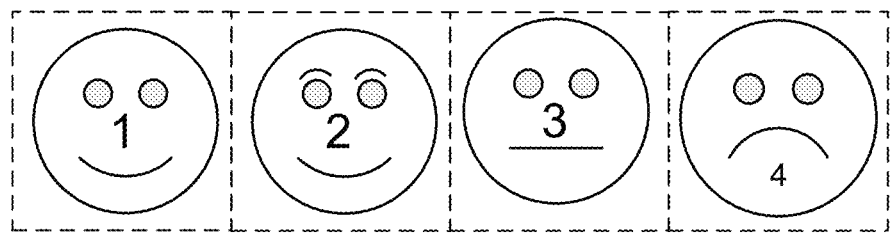

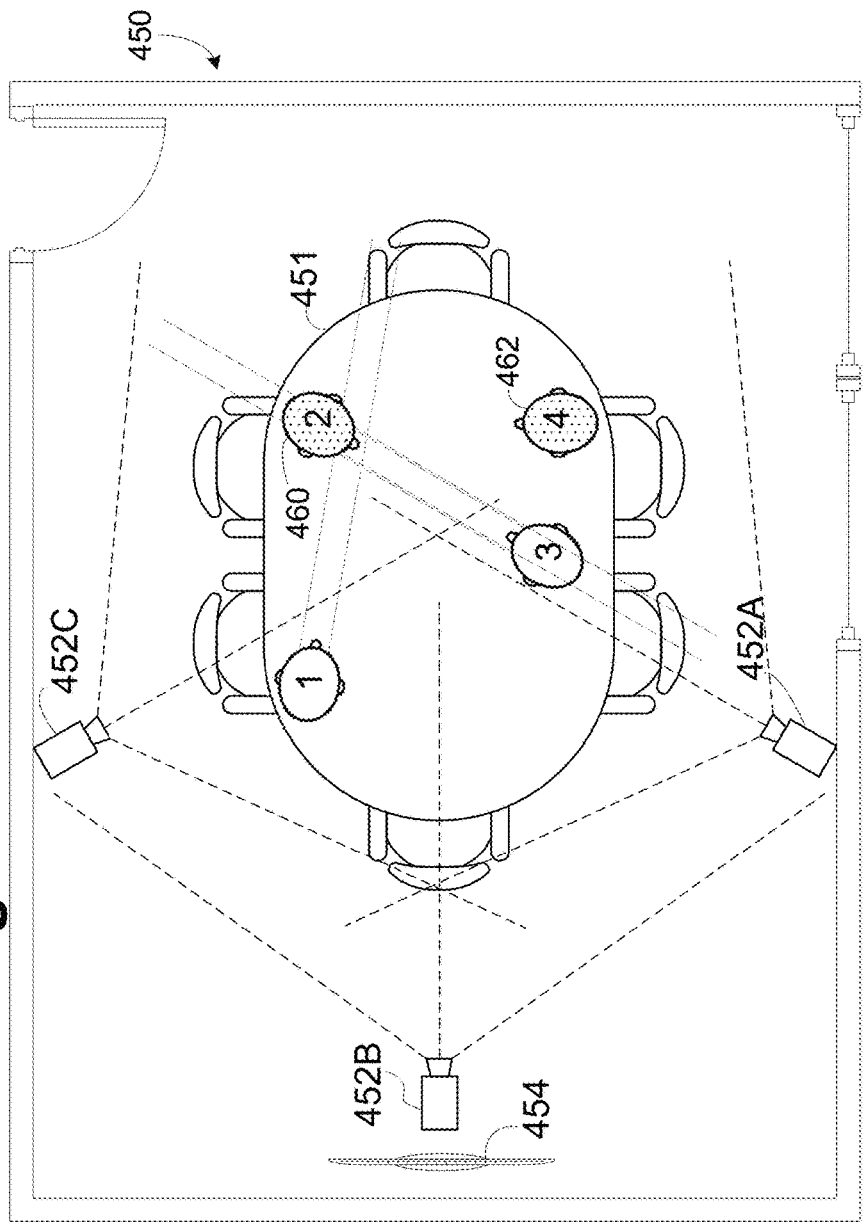
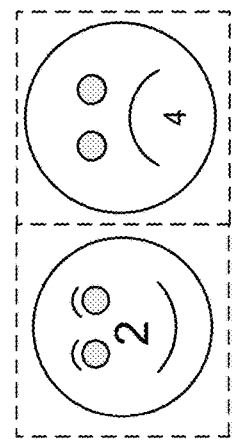

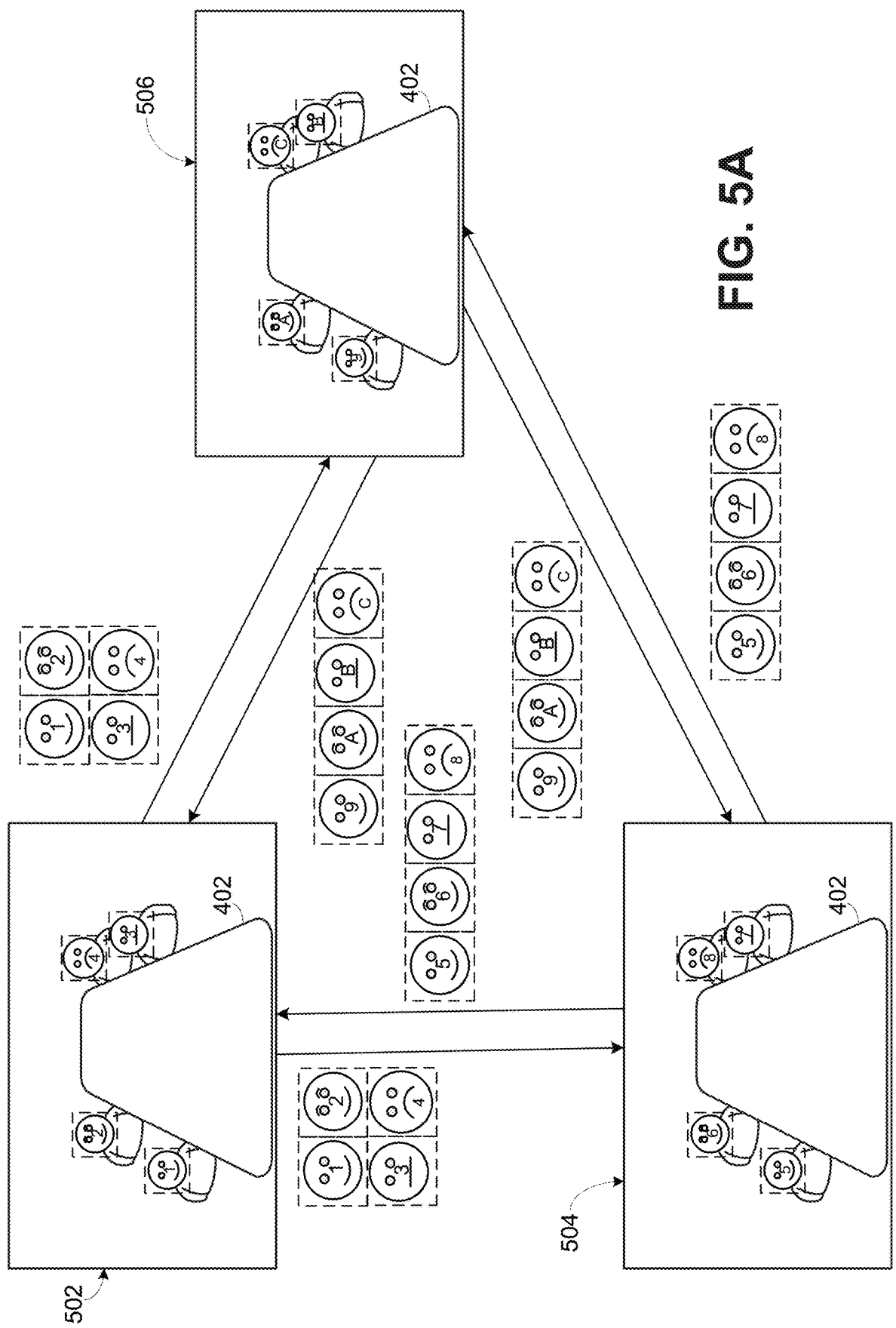

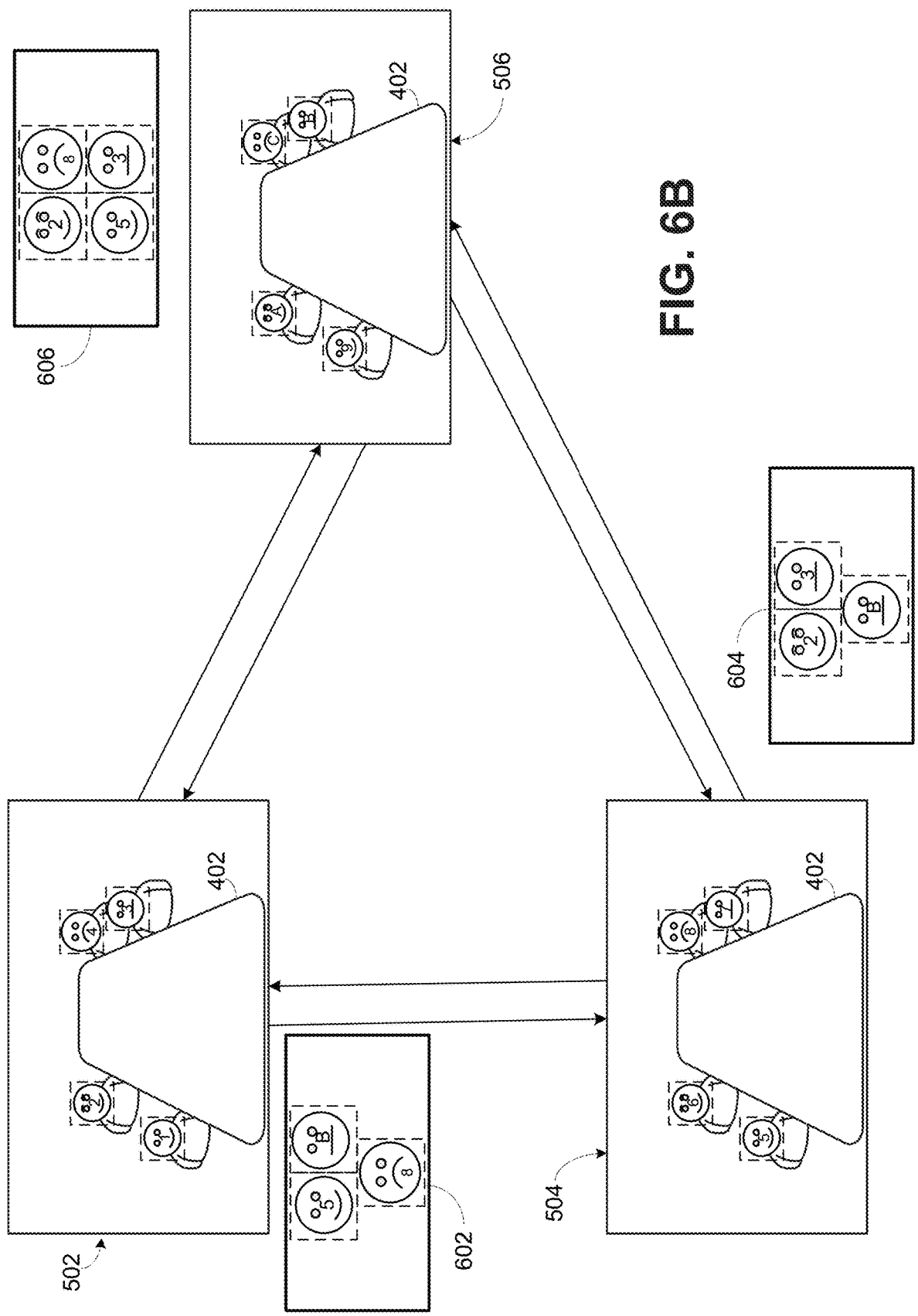

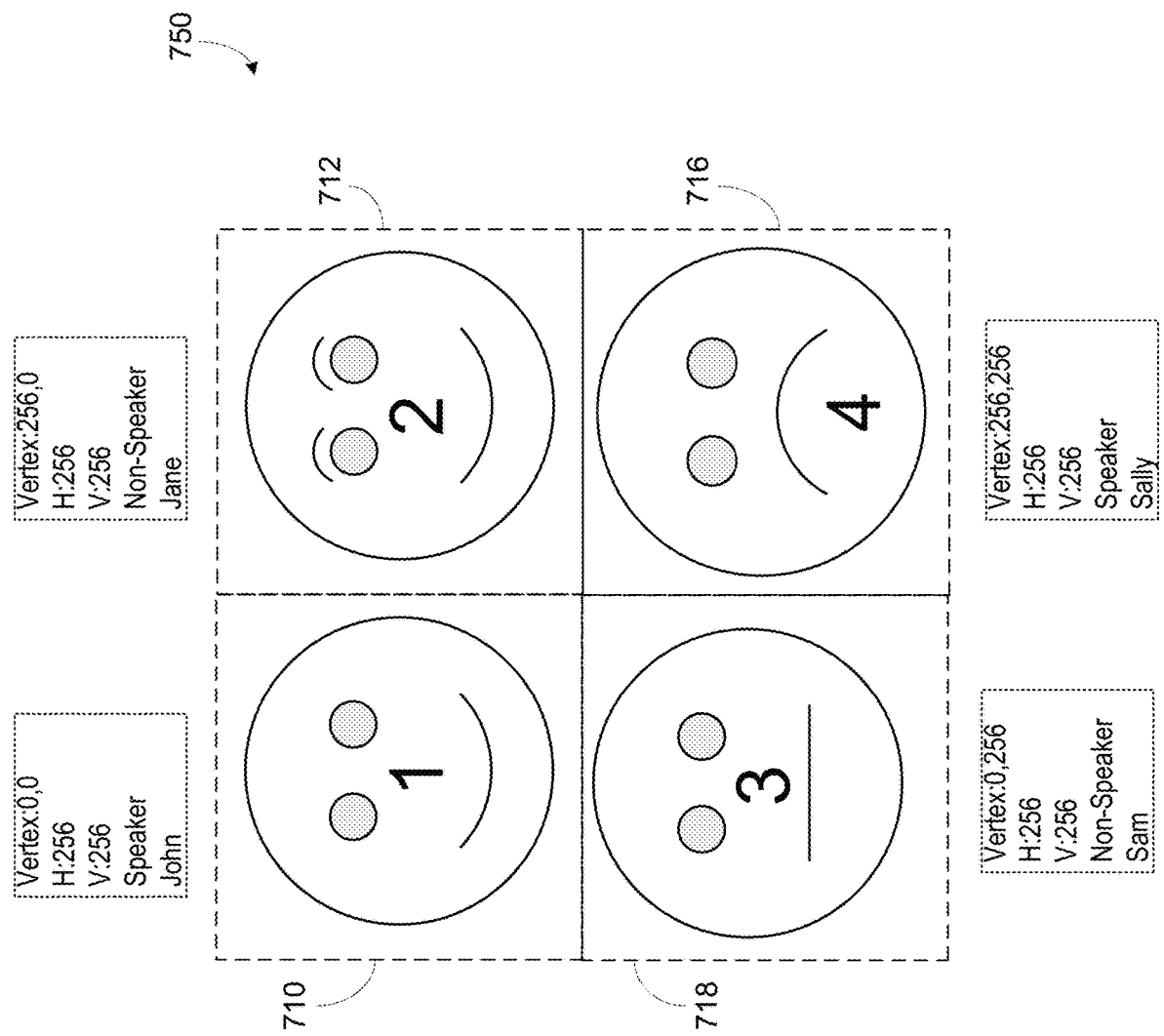

REPRESENTATION AND COMPRESSION OF GALLERY VIEW FOR VIDEO CONFERENCING

FIELD OF THE INVENTION

The present disclosure relates to video stream processing, and more particularly to transmission of images of multiple individuals.

BACKGROUND

For many years videoconferencing was primarily a conference room to conference room method of communication. Multiple participants would sit in respective conference rooms and video streams of the conference rooms would be exchanged. A continuous presence layout of participants placed each conference room into a different window or square.

Over time, single person endpoints based on personal computers and cell phones became commonplace, so that the paradigm of videoconferencing began to change. The paradigm shift accelerated dramatically when individuals were required to work from home and not go to the office, and hence did not have access to a conference room. Everyone began working from home using their PCs or cell phones as the videoconferencing endpoints. The common arrangement of a continuous presence videoconference had single individuals in each window or square, referred to here as gallery view.

As we move forward into an expected hybrid environment, where some people work from an office and have access to a conference room, and others work from home using their personal computers, it would be desirable to provide uniformity to a hybrid environment.

BRIEF DESCRIPTION OF THE DRAWINGS

FIG. 3A is an illustration of a first conference room view for developing a gallery view according to the present invention.

FIG. 3B is an illustration of a video frame for the view of FIG. 3A according to the present invention.

FIG. 4A is an illustration of a second conference room view for developing a gallery view according to the present invention.

FIG. 4B is an illustration of a video frame for the view of FIG. 4A according to the present invention.

FIG. 5A is an illustration of a first videoconference operating with gallery view according to the present invention.

FIGS. 7A and 7B are illustrations of video frames for gallery view and related metadata according to the present invention.

DETAILED DESCRIPTION

Figure 1A:
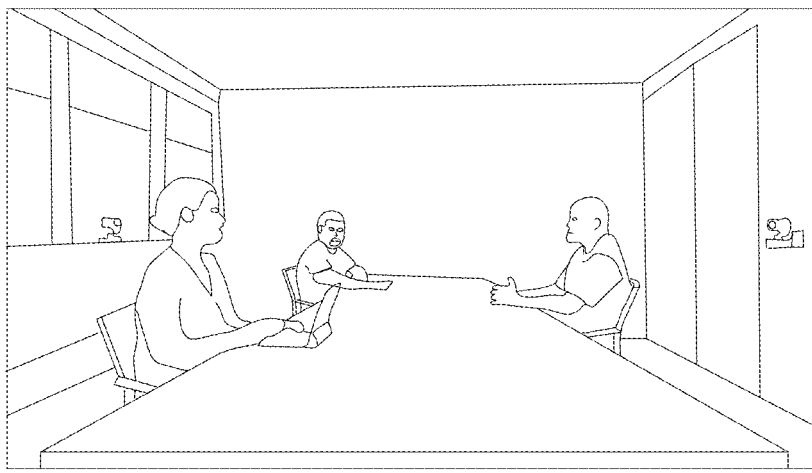
FIGS. 1A-1C are illustrations of a first gallery view operation.
Figure 1B:
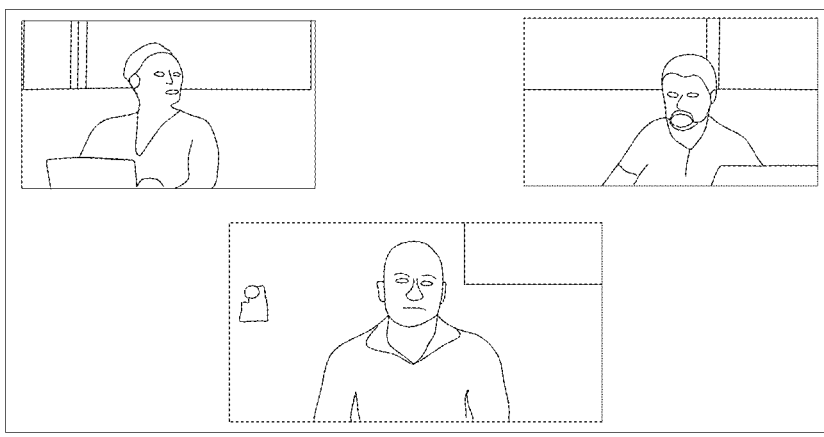
Figure 1C:
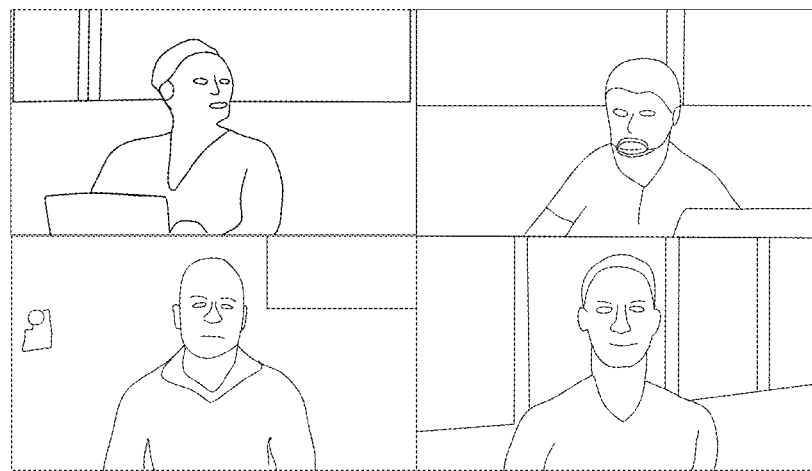

In FIG. 1A, a conference room with three individuals is illustrated. There are two cameras in the conference room, one on each side. Each of the three participants in the conference room are developed as shown in FIG. 1B using the two cameras in the conference room. These three views are then provided from the endpoint of the conference room to the other endpoints in the conference and a continuous presence display as shown in FIG. 1C is developed. The example of FIG. 1C is one individual in an office and the three participants from the conference room. To allow the development of the continuous presence layout of FIG. 1C, the individual participants as shown in FIG. 1B would be transmitted as individual video streams to allow rearrangement by the receiving or far end unit to produce the layout of FIG. 1C. This use of individual streams is problematic as it increases the number of encoders and decoders and the bandwidth required to communicate between the various endpoints. As such, the method is not particularly extensible to larger conferences or for use with simpler endpoint devices.

Figure 2A:
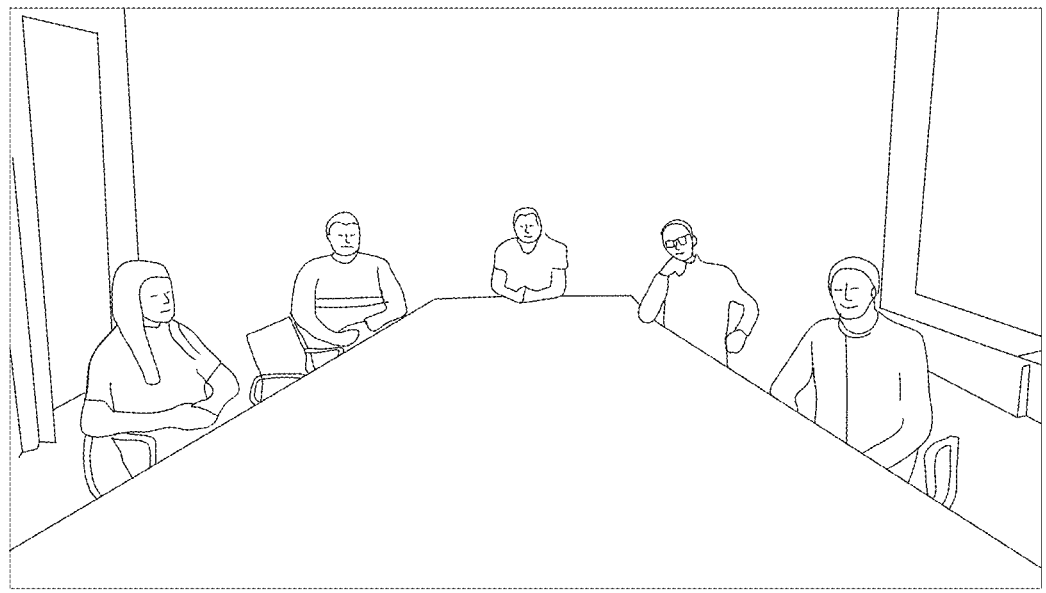
FIGS. 2A and 2B are illustrations of a second gallery view operation.
Figure 2B:
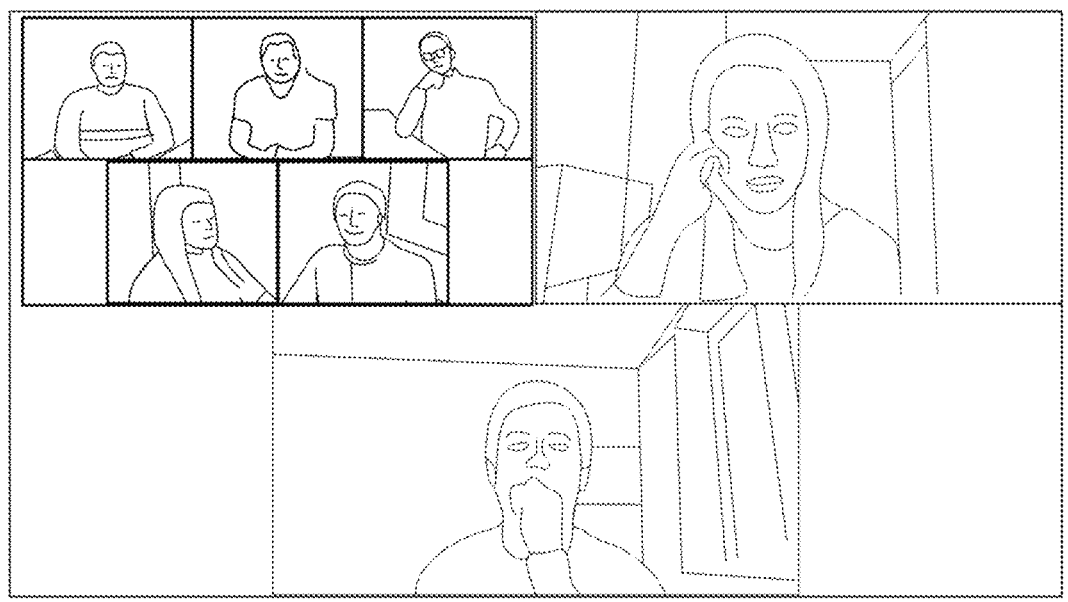

An approach using only a single video stream from an endpoint is illustrated in FIGS. 2A and 2B. As seen in FIG. 2A, there are five participants in the conference room of FIG. 2A. As seen in FIG. 2B, a window or square is developed for each of those individual participants in the conference room and provided in a single composed video stream. That single video stream becomes one window or block in the larger continuous presence layout of FIG. 2B. As can be seen, the participants in the conference room are much smaller than the individuals that are operating from their own residences in FIG. 2B. Therefore, while each individual or participant may be presented individually in their own window or square, the overall effect is not similar to the effect of each individual working from home, which would normally result in each individual having a window of approximately the same size for the entire continuous presence layout.

To address these shortcomings, the development of a region of interest (ROI) video frame that includes only ROIs of interest and not other elements and providing the ROI video frames in a single video stream simplifies the development of gallery view continuous presence displays. ROI position and size information metadata can be provided or subpicture concepts of the particular codec can be used to separate the ROIs in the ROI video frame. Metadata can provide perspective/distortion correction values, speaker status and any other information desired about the participant or other ROI, such as name. Only a single encoder and a single decoder is needed, simplifying both transmitting and receiving endpoints. Only a single video stream is needed, reducing bandwidth requirements. As each participant can be individually isolated, the participants can be provided in similar sizes and laid out as desired in a continuous presence display that is pleasing to view.

Referring now to FIG. 3A, a conference room 400 is illustrated with a conference room table 402. A series of four participants 404, 406, 408 and 410 are seated around the conference room table 402. Each participant 404-410 is shown with a bounding box around the participant's head. In this first example, each of the participants is to be transmitted to the far end the videoconference. Therefore, the faces as determined by the bounding boxes of each of the participants 404-410 are developed from the overall image of the conference room 400 and configured to form a video frame 420 as shown in FIG. 3B. In the video frame 420, the heads of each of the participants 404-410 are adjacent and provide a video frame that is just the heads of the four individuals.

FIG. 4A illustrates a second example where a conference room 450 is illustrated with a conference room table 451. Three cameras 452A, 452B and 452C are present in the conference room 450 to provide alternate views around the conference room table 451. A monitor or display 454 is provided at one end of the conference room 450. In this example of FIG. 4A, only speaking participants are to be transmitted far end. In this case that is participants 460 and 462. Participant 460 is captured by camera 452B, as the view for participant 460 is blocked in the view of camera 452A. A view of participant 462 is provided from camera 452C. The two views from the two cameras 452B, 452C of the two heads of participants 460 and 462 are provided as a frame 470 as shown in FIG. 4B. Even though the conference room 450 includes four participants, as noted, only speaking participants are being transmitted, so that is just participants 460 and 462.

FIG. 5A is an illustration of a three endpoint peer-to-peer conference. In the illustrated example, each endpoint has a view of a conference room table 402 with four participants. As in the example of FIG. 3A, the head of each of the participants is transmitted from the respective endpoint or near end. Thus, endpoint 502 transmits video frames formed by the heads of the individual participants 1-4. The endpoint 504 provides video frames formed from the heads of participants 5-8. Endpoint 506 provides video frames formed of the heads of the participants 9, A, B and C. The respective video frames are shown adjacent the lines connecting the endpoints 502, 504, 506.

Figure 5B:
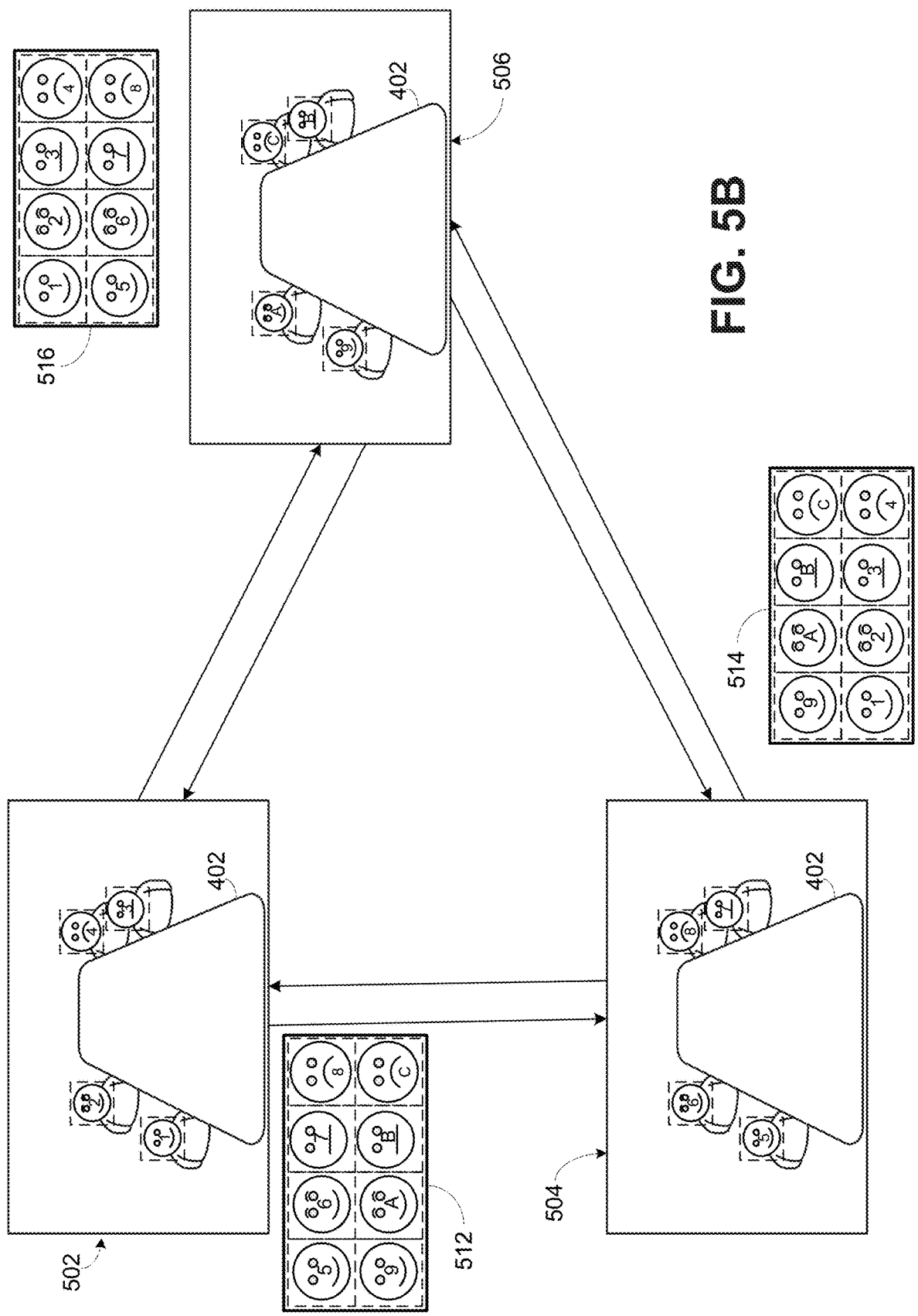
FIG. 5B is an illustration of the gallery view continuous presence layouts of the first videoconference of FIG. 5A according to the present invention.

FIG. 5B illustrates exemplary continuous presence displays provided by each of the endpoint 502, 504 and 506. The continuous presence display 512 is provided at endpoint 502 and illustrates the four participants from endpoint 504 and the four participants from the endpoint 506. Similarly, the continuous presence display 514 at endpoint 504 shows the four participants of the conference room of endpoint 502 and the four participants from endpoint 506. In like manner, the continuous presence display 516 of endpoint 506 is formed by the individual heads of the participants of endpoints 504 and 502.

Figure 5C:
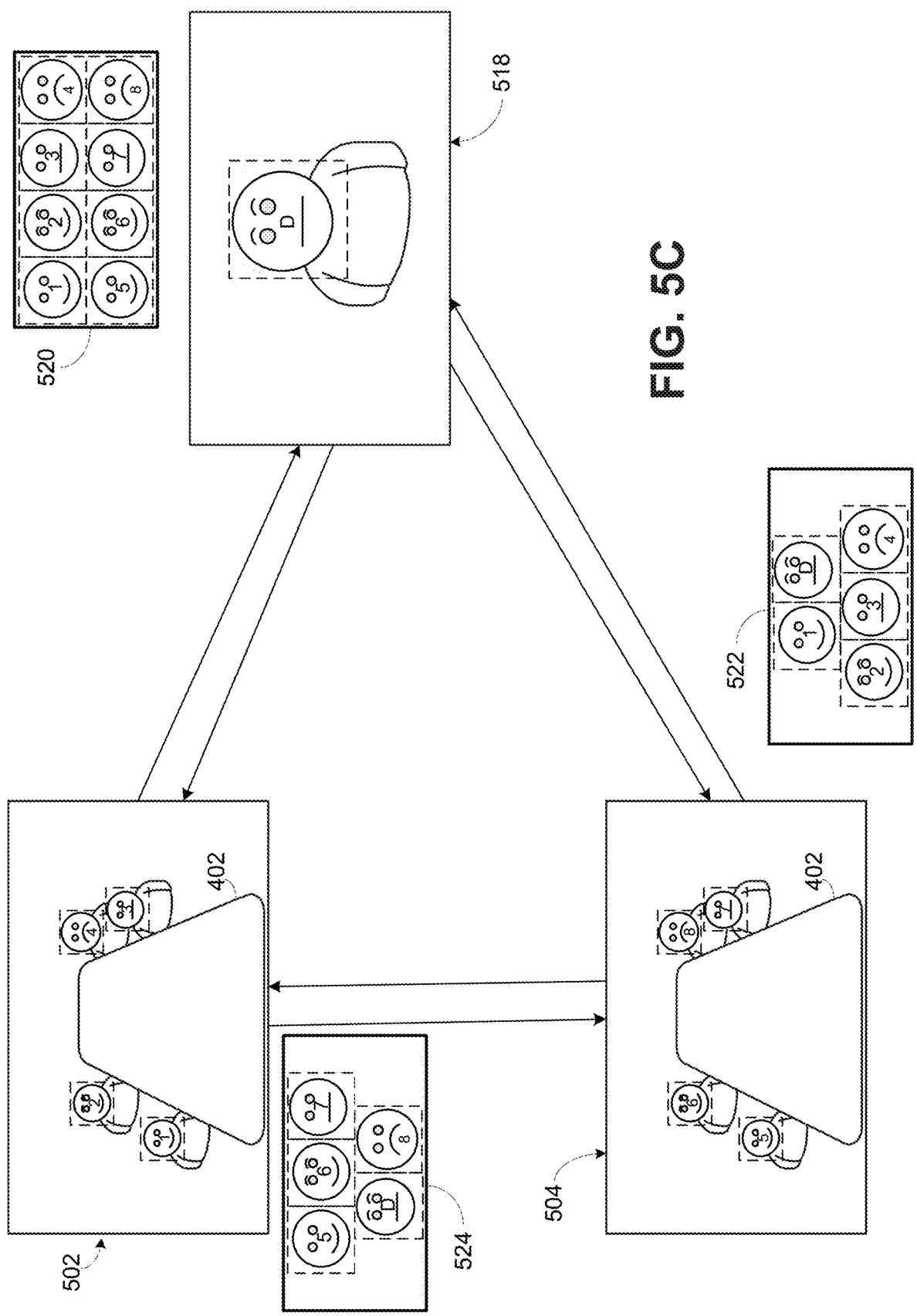
FIG. 5C is an illustration of the gallery view continuous presence layouts of the FIG. 6A is an illustration of a second videoconference operating with gallery view according to the present invention.

FIG. 5C replaces endpoint 506 with the conference room four participants with an endpoint 518 with a single participant. Example endpoint 518 could be a laptop or desktop computer, a cellular phone or tablet or similar. Continuous presence display 520 of endpoint 518 illustrates the eight individuals in the conference rooms of endpoints 502 and 504. Continuous presence display 522 associated with endpoint 504 illustrates a configured layout of the four participants from endpoint 502 and the individual from endpoint 518. Similarly, continuous presence display 524 illustrates a layout of the four individuals from endpoint 504 and the individual from endpoint 518. As can be seen, the layouts of continuous present displays 522 and 524 are different, with the individual from endpoint 518 placed in different locations. This differing location is based on the choice of the respective endpoint 502, 504.

Figure 6A:
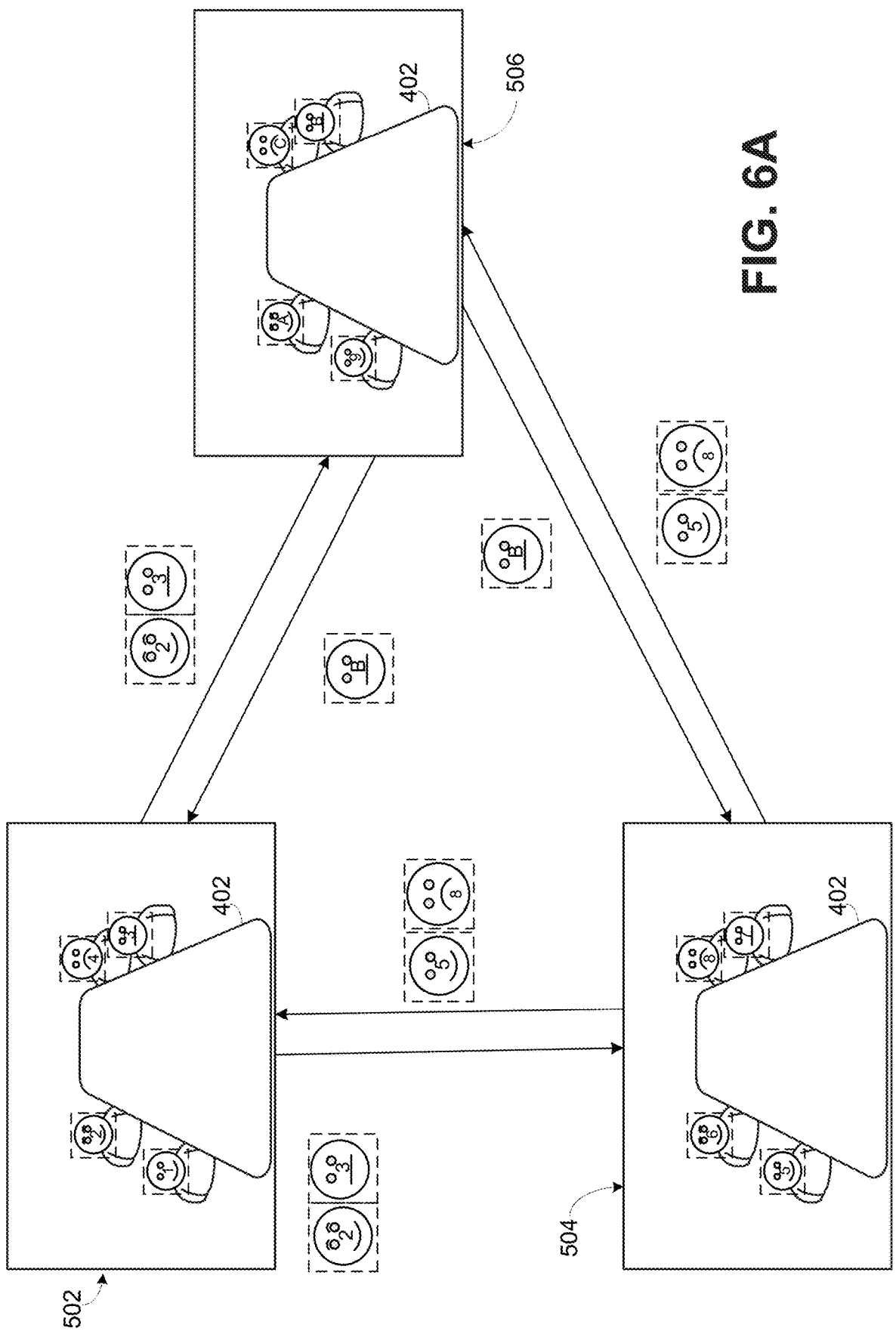
FIG. 6B is an illustration of the gallery view presentations of the second videoconference of FIG. 6A according to the present invention.
FIG. 6C is an illustration of the gallery view presentations of a third videoconference according to the present invention.

FIG. 6A illustrates operation of the endpoints 502, 504 and 506 when video of only the speaking or talking participants is provided from a particular endpoint. For example, in endpoint 506 only individual B is speaking and therefore only individual B is provided to the endpoints 504 and 502. Similarly, at endpoint 504 only individuals 5 and 8 are speaking, so those are the only individuals whose faces are provided to endpoints 502 and 506. Likewise, in endpoint 502 only individuals 2 and 3 are speaking. Therefore, those of the two individuals provided to endpoints 504 and 506.

Exemplary continuous presence displays are shown in FIG. 6B. Continuous presence display 604 of endpoint 504 shows individuals 2, 3 and B. Continuous presence display 602 is provided at endpoint 502 and includes individuals 5, 8 and B. Note that the location of individual B is not the same in the continuous presence displays 602 and 604 as the individual layout of the continued presence display is determined by the endpoint 502 or 504. Continuous presence display 606 of endpoint 506 shows individuals 2, 3, 5 and 8. The particular participants of continuous presence display 606 are arranged in a diagonal configuration based on the choice of the endpoint 506. Any desirable layout can be selected by the particular endpoint based on analysis of the particular individuals and any related metadata.

Figure 6C:
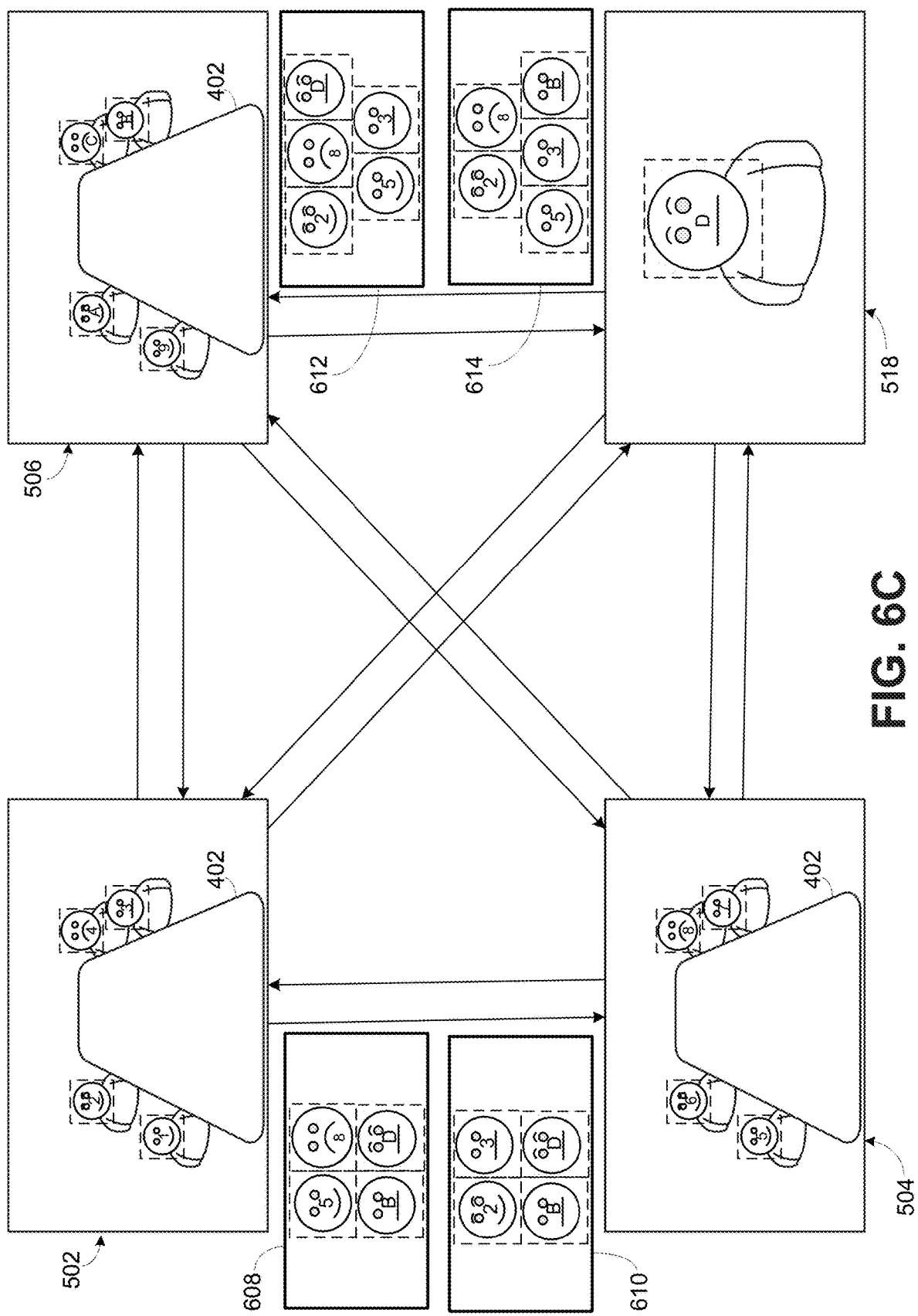

FIG. 6C adds endpoint 518 to the conferences of FIGS. 6A and 6B, resulting in a four-party conference. As in FIGS. 6A and 6B, only speaking individuals are transmitted. Continuous presence display 608, which shows individuals 5, 8, B and D is provided at endpoint 502. Continuous presence display 610 containing individuals 2, 3, B and D is provided in endpoint 504. Continuous presence display 612 is provided at endpoint 506 and includes individuals 2, 8, D, 5 and 3. Continuous presence display 614 is provided at endpoint 518 and includes individuals 2, 8, 5, 3 and B. Again, the particular layout and location of a particular individual in one of the continuous presence displays is determined by the endpoint providing the continuous presence display.

Figure 7A:
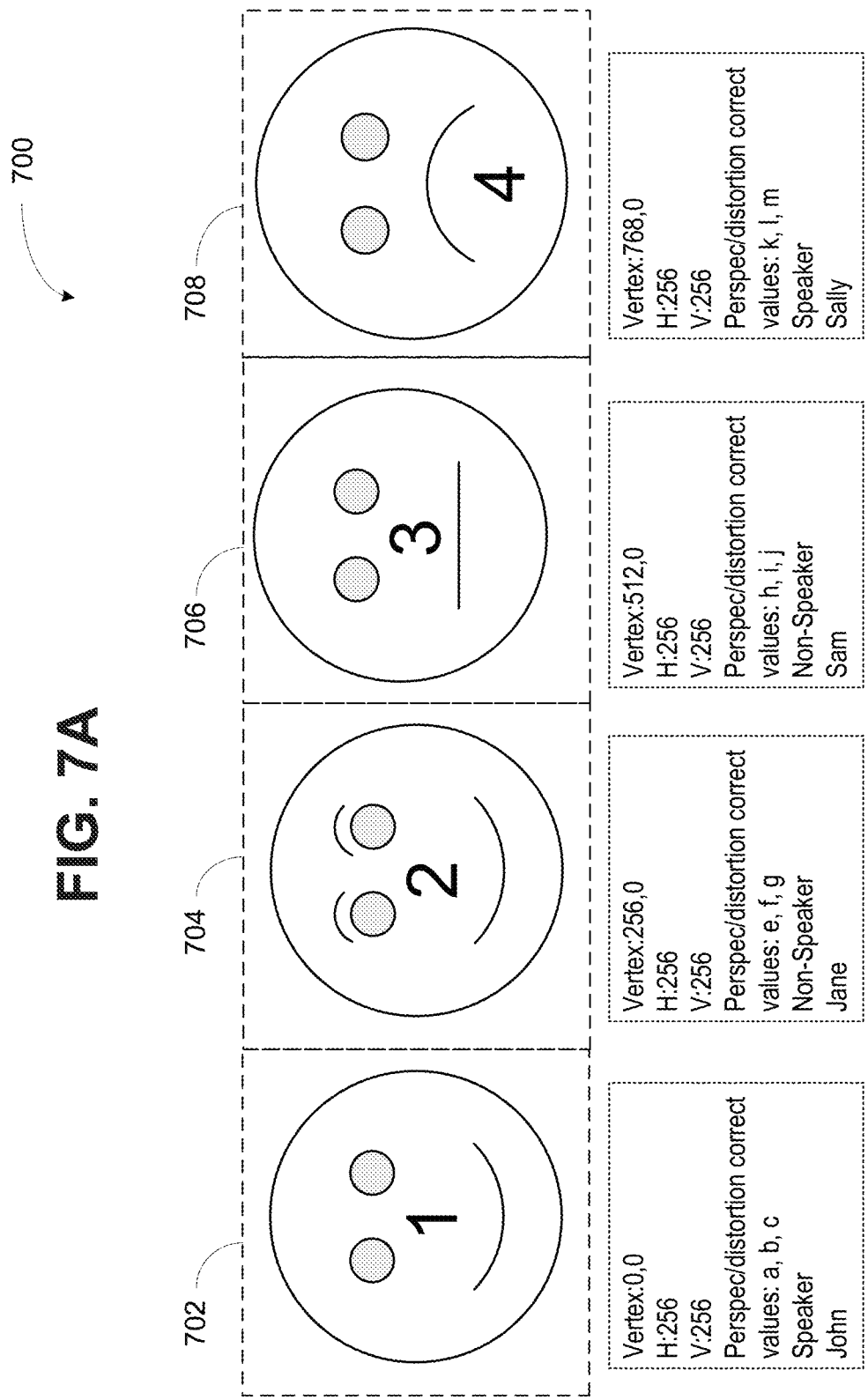

FIG. 7A is an illustration of the transmission of the images of four participants and the metadata which accompanies each of those individuals. In FIG. 7A, the faces of the four individuals are provided in video frame 700 in a serial or adjacent order that is, four wide and one high, so that individual 1 is provided in position 702, individual 2 is provided in position 704, individual 3 is provided in position 706 and individual 4 is provided in position 708. This results in a wide but short video frame 700 being transmitted from the transmitting endpoint to the receiving endpoint. Accompanying the video frame is metadata relating to each of the individuals. The metadata relating to participant 1 is provided below position 702 and indicates a location having a vertex of zero, zero; a horizontal size or width of 256 pixels; a height or vertical size of 256 pixels; perspective/distortion correction values a, b, c used to perform the appropriate transformation; an indication that the individual is a speaker and the name of the individual, in this case, John. Individual 2 in position 704 has metadata that includes a vertex at 256, zero, so that it is adjacent to and just to the right of position 702. The image has a horizontal width of 256 pixels, a vertical height of 256 pixels, has perspective/distortion correction values of e, f, g; indicates that the individual two is a non-speaker and has a name of Jane. Individual 3 in position 706 has metadata that includes a vertex value 0512, zero, which indicates it is directly adjacent to the right of position 704. The horizontal width is 256 pixels; the vertical height is 256 pixels; perspective/distortion correction values are h, i, j; individual 3 is a non-speaker and has a name of Sam. Individual 4 in position 708 has metadata which indicates a vertex value of 768, zero, which is adjacent to and right of position 706; a horizontal pixel width of 256; a vertical pixel height of 256; perspective/distortion correction values of k, l, m; that individual four is a speaker and is named Sally.

FIG. 7B illustrates an alternate arrangement of transmitting the four individuals in a single video frame 750. While in FIG. 7A the four individuals were provided adjacent each other in a single row, in FIG. 7B the individuals are provided in a square, each individual being one quadrant of the square. Therefore, individual 1 is in position 710, the upper left quadrant; individual 2 is in position 712, the upper right quadrant; individual 3 is in position 714, the lower left quadrant; and individual 4 is in position 716, the lower right quadrant. Metadata for individual 1 indicates a vertex value of zero, zero; a horizontal width of 256 pixels; a vertical height of 256 pixels; that individual 1 is a speaker and is named John. Individual 2 has metadata which indicates that position 712 is at a vertex value of 256, zero; the horizontal width of 256 pixels; a vertical height of 256 pixels; that individual two is a non-speaker and her name to Jane. The metadata associated with individual 3 indicates that the vertex is at zero, 256, indicating the second row; a horizontal width of 256 pixels; a vertical height of 256 pixels; individual 3 is a non-speaker and his name Sam. Finally, individual 4 includes metadata which indicates that the vertex is at location 256, 256; a horizontal width of 256 pixels; a vertical height of 256 pixels; that individual 4 is a speaker and is named Sally.

The vertex and horizontal and vertical dimensions in the metadata for each individual allow the decoder in the receiving endpoint to separate out the individuals when the frame is decoded, to allow the receiving endpoint to position the individual individuals in a continuous present layout as desired by the receiving endpoint. This allows the receiving endpoint to vary the layout from the format in which the frame is provided to the receiving endpoint.

The provision of the perspective/distortion correction values allows for perspective and distortion correction of the images of the individuals. As the images are located in different portions of the relevant conference room, there will be different perspective and correction values needed to make the individuals appear properly sized and proportioned. For reference, perspective refers to "stretching" in a portion of an image such that objects appear larger in one or more dimensions than is natural, while distortion refers to bending of light such that straight lines appear curved in an image. In some examples, perspective correction is to be performed on smaller images or images from nearer the edge of the full frame, while distortion correction is to be performed on larger images or images from nearer the center of the full frame. As in some examples, only the individual head shots are being provided, and not the entire frame of the room, the receiving endpoint cannot develop perspective/distortion correction values based on the location of the individuals in the entire frame. By providing the perspective and distortion correction values as metadata with the particular individual, the receiving endpoint can perform the necessary perspective and distortion correction without requiring the entire room scene to be transmitted. The speaker or non-speaker metadata values can be utilized by the receiving endpoint in the layout of the continuous presence display as desired. For example, the receiving endpoint could place the speakers in a top row and the non-speakers in a bottom row or omit the non-speakers entirely.

Figure 8:
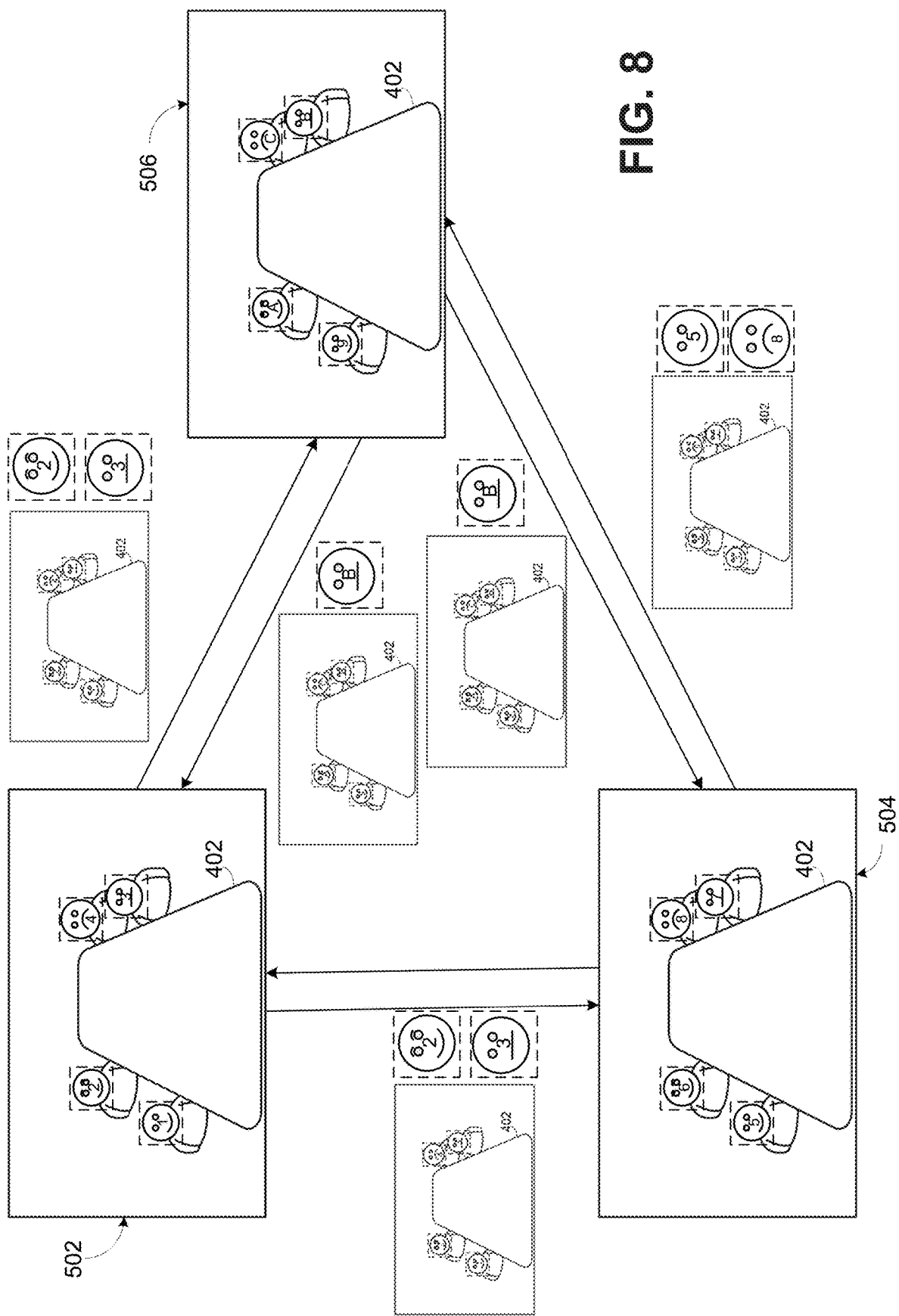
FIG. 8 is an illustration of the first video conference of FIG. 5A where gallery view video frames and whole room video frames are provided according to the present invention.

FIG. 8 illustrates an example where a view of the entire room is provided in addition to the images of the particular speaking individuals. Endpoint 502 provides a first frame including individuals 2 and 3 and a second frame of the wide shot of the entire conference room to both endpoints 504 and 506. Endpoint 504 provides a first region of interest (ROI) video frame of speakers 5 and 8 and a second video frame of the entire room. Endpoint 506 provides an ROI video frame of the speaker B and a video frame of the entire room. In providing the speaking individuals and the entire room, the receiving endpoint has many options for developing a continuous presence display, for example, displaying the entire room but also displaying the speaking individual in a larger box. Further, as the entire room is provided, correction/distortion values need not be provided as the view of the entire room is available to be used to calculate the next necessary distortion and perspective correction values.

Figure 9:
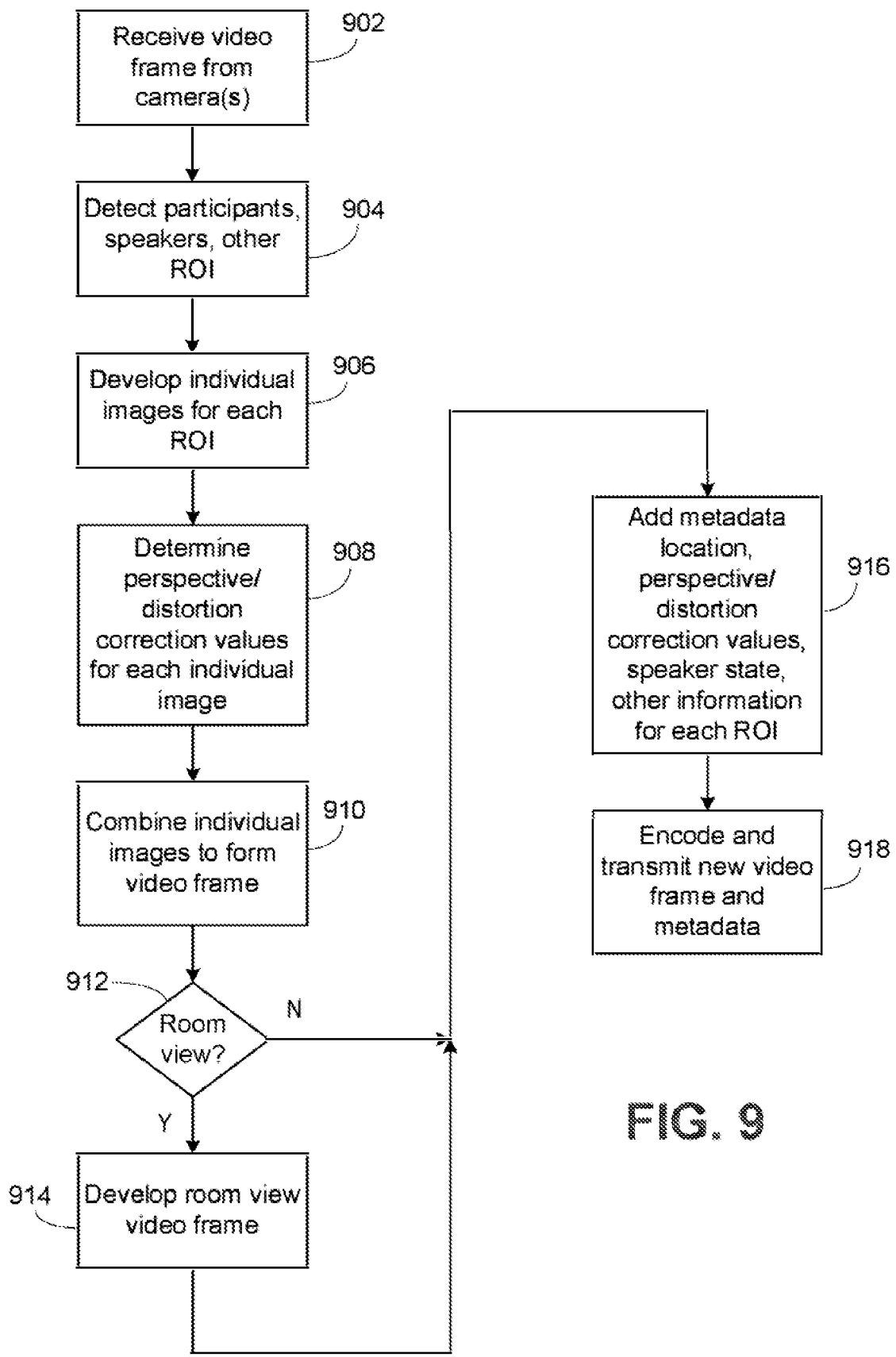
FIG. 9 is a flowchart of operation of a near end videoconference endpoint according to the present invention.

FIG. 9 is a flowchart of operations of a transmitting endpoint. In step 902, the endpoint receives the video frames from each of the cameras in the particular conference room. In step 904, the participants, the speakers and any ROIs, such as a whiteboard or easel, are detected. In step 906, individual images for each of the ROIs, such as a participant or a speaker, are developed. In step 908, the perspective/distortion correction values for each individual image are calculated to be provided to the receiving endpoint. The detection of step 904, the development of step 906 and the correction of step 908 can be done many different ways. In step 910, the individual images are combined to provide a new video frame to be transmitted from the transmitting endpoint. In step 912, a determination is made whether a room view is to be provided in addition to the video frame of the individual images. If so, in step 914, a full room view is added to the combined individual images. After step 912, if there is no room view, or after step 914, in step 916 the metadata of the location of each image in the video frame or frames, be it an ROI or the entire room, the distortion/perspective correction values, the speaker state and any other desired information about the region of interest is added for each individual ROI or the entire room. In step 918, the video frame or frames are encoded and transmitted in conjunction with the metadata to be received by the various receiving endpoints.

Figure 10:
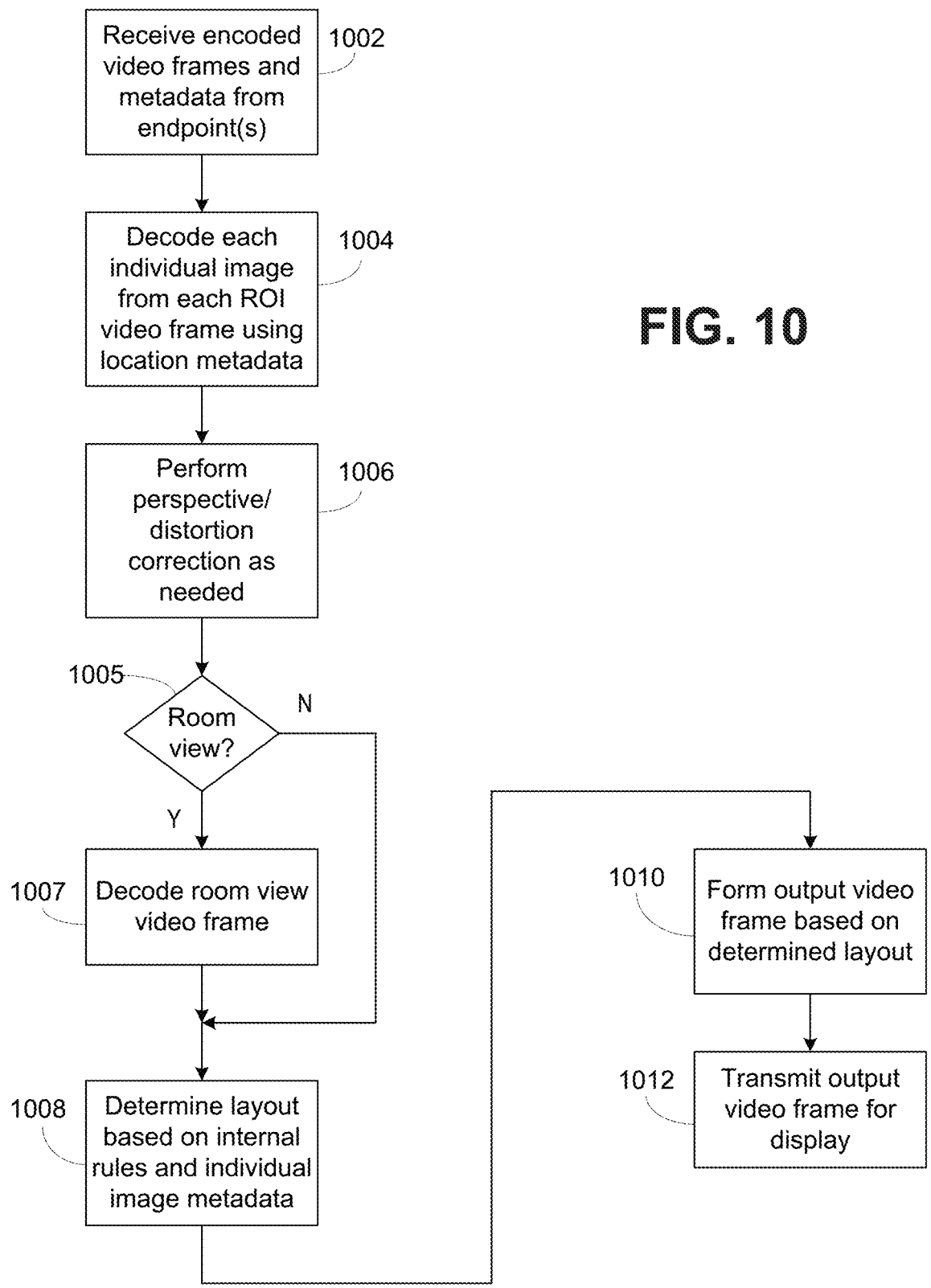
FIG. 10 is a flowchart of operation of a far end videoconference endpoint according to the present invention.

FIG. 10 is a flowchart of operation of a receiving endpoint that receives the video provided by the transmitting endpoint of FIG. 9. In step 1002, the received ROI video frames are received, as is the metadata. In step 1004, each individual image in the ROI video frame is decoded or extracted using the position and location information provided in the metadata. In step 1006, perspective/distortion calculations are performed on the particular individual images. In step 1005, a determination is made whether a room view video frame is present. If so, in step 1007 that room view video frame is decoded. If no room view in step 1005 or after step 1007, in step 1008, the layout for the particular continuous presence display is determined based on various internal rules; individual image metadata, such as speaker or non-speaker and so on and presence of a room view video frame. In step 1010, an output video frame is formed based on the determined continuous present layout. In step 1012, the output video frame is transmitted to the display for presentation to the individuals at the receiving endpoint.

As mentioned above, the example gallery view of FIG. 1C is provided as separate video streams using separate encoders and decoders for each stream. Instead of using multiple encoders and decoders for the individuals or other ROIs, examples according to the present invention use only a single encoder to encode the new video frame of the individuals or other ROIs. In addition, if a "main" view video frame is needed, it can be encoded separately as normal. The choices of video codecs can be AVC/H.264, HEVC/H.265, VVC/H.266 or VP9 and AV1, and others if a coding tool for rectangular regions is provided.

With any codec, the ROI video frame can be encoded as a single frame and the decoder can use position and size metadata to extract the particular individuals or other ROIs after decoding the frame as described above. However, various codecs provide "subpicture" capabilities that allows the individual images to be obtained as part of the decoding process itself without the need for the position and size metadata and some operations on the decoded frame. For those codecs, encoder step 916 is simplified by not including position and size metadata and encode step 918 encodes the new video frame into the relevant "subpicture" encoding described below. Step 1004 of the decoder is simplified as position and size metadata is not used and the separation of the individual images is performed as part of the decoding, not by extracting them from a decoded frame.

As these ROIs are coded in "subpictures," which methods vary between codecs, the ROIs can be decoded independently. The decoded ROIs can then be rendered in any place on display screens. In one example, if the detected active speaker ROI defaults to a fixed position in the new composed ROI video frame, the far-end decoder can easily tell the speaker is without resorting to the use of metadata.

To encode the ROI video frame for gallery view use, one example is to create a new ROI video frame that only covers the ROIs for the gallery view. The resolution of the new ROI frame is in terms of pixel blocks from 16×16 to 128×128. As there are changes in the number of ROIs and the areas of the ROIs, the resolution changes. This can be implemented in the chosen codec's picture parameter set syntax.

In a second example, a new ROI video frame is created that has the same resolution as the video frame of the "main" camera frame and the ROIs are inserted in the pre-defined locations of the new frame. This does not require the change of picture parameters but has reduced flexibility.

If a full view of the conference room is utilized, the "main" camera frame is encoded as normal in one example and provided as a separate frame. For a single camera, the "main" camera is the single camera. For multiple cameras, the "main" camera can be found by the sound source localization (SSL) or other means.

In some examples, generally preferred, the new video frame of just the ROIs is encoded using subpicture concepts, which vary for each codec.

A first example codec is AVC/H.264. The AVC/H.264 protocol defines slice groups that specify a group of 16×16 macroblock maps to form regions in a frame. Each slice group can be independently decoded. One of slice group types, slice_group_map_type 2, defines a rectangular region. The number of slice groups, and the type and the location of an ROI are coded in the picture parameter set (PPS).

To utilize this coding tool, define the number of slice groups as the number the of ROIs. In a slice group, there is a raster-scan slice that covers an ROI. The area of the ROI is in terms of the number of 16×16 pixel macroblocks. Each ROI can be scaled or padded to a unified slice group size or remain as the original size. For an example, if the area of an ROI is 128×128 pixels, then there exist 8×8 i.e., 64 macroblocks (128×128/16×16), and this ROI is presented in a slice group in the new frame. Any uncovered regions in the frame are assigned to one slice group and they can be skipped with no coding.

The decoder decodes and separates each slice group to be an individual location of the gallery view continuous presence display. Metadata can be used to aid in developing the actual layout of the individual slice groups.

A second group of exemplary codecs are HEVC/H.265 and VVC/H.266. The HEVC/H.265 and VVC/H.266 protocols provide Tile and Slice Group structures for encoding rectangular regions. In addition, VCC/H.266 provides a subpicture concept to compress regions of interests. A Tile consists of a group of Coding Tree Units (CTU) that has a size from 16×16 up to 64×64 pixels in HEVC/H.265 and up to 128×128 in VVC/H.266 and a slice segment can have a group of tiles.

To utilize the Tile and Slice Group structures, let the rows of the ROIs for the gallery view be the number of rows of tiles and let the columns of the ROIs for the gallery view be the number of columns of tiles. Set the tile_enabled_flag and place the numbers of the rows and columns of tiles in the PPS set. Thus, the ROIs are encoded as tiles in the ROI video frame. For an example, let a CTU be 64×64. If an ROI is 128×128 pixels, then the tile has 2×2 or 4 CTUs (128×128/64×64). A slice segment is assigned to encode this ROI.

VVC/H.266 also provides a specific coding tool, subpicture, to enable a far-end decoder to decode the subpicture only. Each individual ROI is encoded as a separate subpicture and the decoder uses the subpicture information to directly develop the individual images.

A third codec is AV1. AV1 also offers a tile structure that consists of superblocks (up to 128×128 pixels) to encode a rectangular region. To encode an ROI as tiles in a frame, set obu_tile_group in AV1's Open Bitstream Unit (OBU). Like the concept of a subpicture in VCC/H.266, AV1 provides a Large-Scale-Tile tool to decode an ROI only.

In some examples, encoding constraints need to be applied, including but not limited to restricting motion estimation to stay within the boundaries of the rectangular regions. With some sets of constraints, these regions are not fully independent, but reduced complexity decoding is still possible. For instance, the symbols in the full bitstream might need to be decoded, but motion compensation and inverse transforms for rectangles that are not of interest can be skipped. In the case of HEVC, the deblocking filter/sample adaptive offset must not cross ROI boundaries.

Subpictures can also be used advantageously by receiving endpoints. In some cases, the receiver might be receiving more ROIs than it chooses to display. Since subpictures are independently decodable, the receiver can extract and decode only the ROIs of interest. That can reduce the computational load at the receiver, thereby reducing the power use.

Similarly, subpictures can also reduce transcoding complexity in a multipoint control unit (MCU), improving scalability and power efficiency. In some cases, the MCU might not need to transcode at all. The MCU can selectively extract ROIs from the video streams of the various endpoints and construct new composed streams without leaving the compressed domain. In others, partial decoding of the full received bitstreams is needed but that still is significantly less complex than full decoding.

Subpictures can also be used advantageously by selective forwarding middleboxes (SFMs), sometimes referred to as media relays. SFMs selectively forward video to receivers. As part of that process, SFMs can extract and forward subpictures without fully decoding the received video streams. This is somewhat higher complexity than normal packet forwarding, but it is much lower complexity than full transcoding, and it can be done at wire-speed with no delay. Subpictures from multiple senders can be re-composed into new video streams, with new metadata, without requiring full decoding, allowing an SFM to perform composition that formerly could only be done by a full transcoding MCU. In the case of VVC/H.266, sequence headers and parameter sets may need to be re-written in each output stream to make the new bit-stream compliant. When some pictures are dropped, the resolution of the video stream and perhaps some other headers need to be modified. Subpicture encoding of ROIs therefore allows an SFM to better accommodate receivers with limited display space or bandwidth constraints.

It is also possible to use tile structures and slice groups in other codecs for this purpose, although this requires additional encoding constraints to be applied. For example, motion compensation needs to stay inside the tiles of each ROI.

End-to-end encryption is still possible when SFMs extract subpictures. One simple approach is to place each subpicture in its own RTP packet. The SFM then simply selectively forwards those packets to the receivers. Both SFMs and endpoints can authenticate these packets, but only endpoints can decrypt them. This allows the SFM to create compositions of ROIs or filter out unused ROIs even when it cannot decode those ROIs. Note this might require receivers to modify the encrypted bitstream prior to decoding, rewriting parameter sets for example, in order to present a fully compliant bitstream to the decoder.

In summary, encoding ROIs as independently decodable subpictures can be used to advantageously to reduce complexity, increase scalability, and improve power efficiency in sending endpoints, SFMs, MCUs, and receivers.

Figure 11:
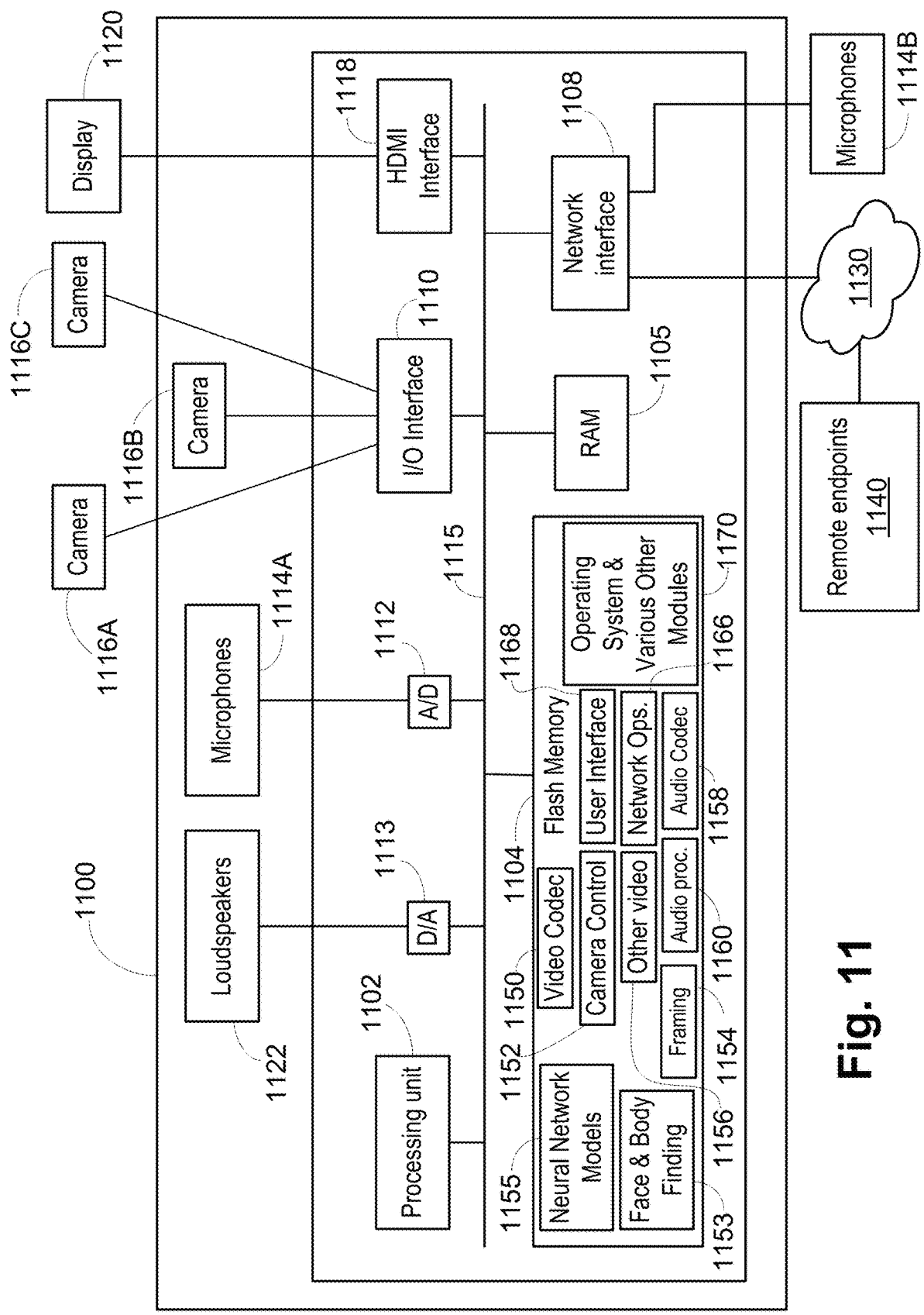
FIG. 11 is a block diagram of a codec according to the present invention.

FIG. 11 illustrates aspects of a codec 1100 used at an endpoint in accordance with an example of this disclosure. The codec 1100 may include loudspeaker(s) 1122, though in many cases the loudspeaker 1122 is provided in the monitor 1120. Microphone(s) 1114A and loudspeaker(s) 1122 are interfaced via an interface to a bus 1115, the microphones 1114A through an analog to digital (A/D) converter 1112 and the loudspeaker 1122 through a digital to analog (D/A) converter 1113. The codec 1100 also includes a processing unit 1102, a network interface 1108, a flash memory or other non-volatile program storage device 1104, RAM 1105, and an input/output (I/O) general interface 1110, all coupled by bus 115. The camera(s) 1116A, 1116B, 1116C are illustrated as connected to the camera I/O interface 1110. Microphone(s) 1114B are connected to the network interface 1108. An HDMI or video output interface 1118 is connected to the bus 1115 and to the external display or monitor 1120. Bus 1115 is illustrative and any interconnect between the elements can used, such as Peripheral Component Interconnect Express (PCIe) links and switches, Universal Serial Bus (USB) links and hubs, and combinations thereof. The cameras 1116A, 1116B, 1116C and microphones 1114A, 1114B can be contained in housings containing the other components or can be external and removable, connected by wired or wireless connections, or camera 1116B can be built into the codec 1100. In some examples, the main camera 116B can be built into the codec 1100, with this example shown in FIG. 11.

The processing unit 1102 can include digital signal processors (DSPs), central processing units (CPUs), graphics processing units (GPUs), dedicated hardware elements, such as neural network accelerators and hardware codecs, and the like in any desired combination.

The flash memory 1104 stores modules of varying functionality in the form of software and firmware, generically programs, for controlling the codec 1100. Illustrated modules include a video codec 1150; camera control 1152; face and body finding 1153; neural network models 1155; framing 1154, which controls the development of the ROI video frame from the individual images and the extraction of the individual images from an ROI video frame; other video processing 1156; audio codec 1158; audio processing 1160; network operations 1166; user interface 1168 and operating system and various other modules 1170. The RAM 1105 is used for storing any of the modules in the flash memory 1104 when the module is executing, storing video images of video streams and audio samples of audio streams and can be used for scratchpad operation of the processing unit 1102. The face and body finding 1153 and neural network models 1155 are used in the various operations of the codec 1100, such as the face and ROI detection step 904.

The network interface 1108 enables communications between the codec 1100 and other devices and can be wired, wireless or a combination. In one example, the network interface 1108 is connected or coupled to the Internet 1130 to communicate with remote endpoints 1140 in a videoconference. In one or more examples, the general interface 1110 provides data transmission with local devices such as a keyboard, mouse, printer, projector, display, external loudspeakers, additional cameras, and microphone pods, etc.

In one example, the cameras 1116A, 1116B, 1116C and the microphones 1114 capture video and audio, respectively, in the videoconference environment and produce video and audio streams or signals transmitted through the bus 1115 to the processing unit 1102. In at least one example of this disclosure, the processing unit 1102 processes the video and audio using algorithms in the modules stored in the flash memory 1104. Processed audio and video streams can be sent to and received from remote devices coupled to network interface 1108 and devices coupled to general interface 1110. This is just one example of the configuration of a codec 1100.

Figure 12:
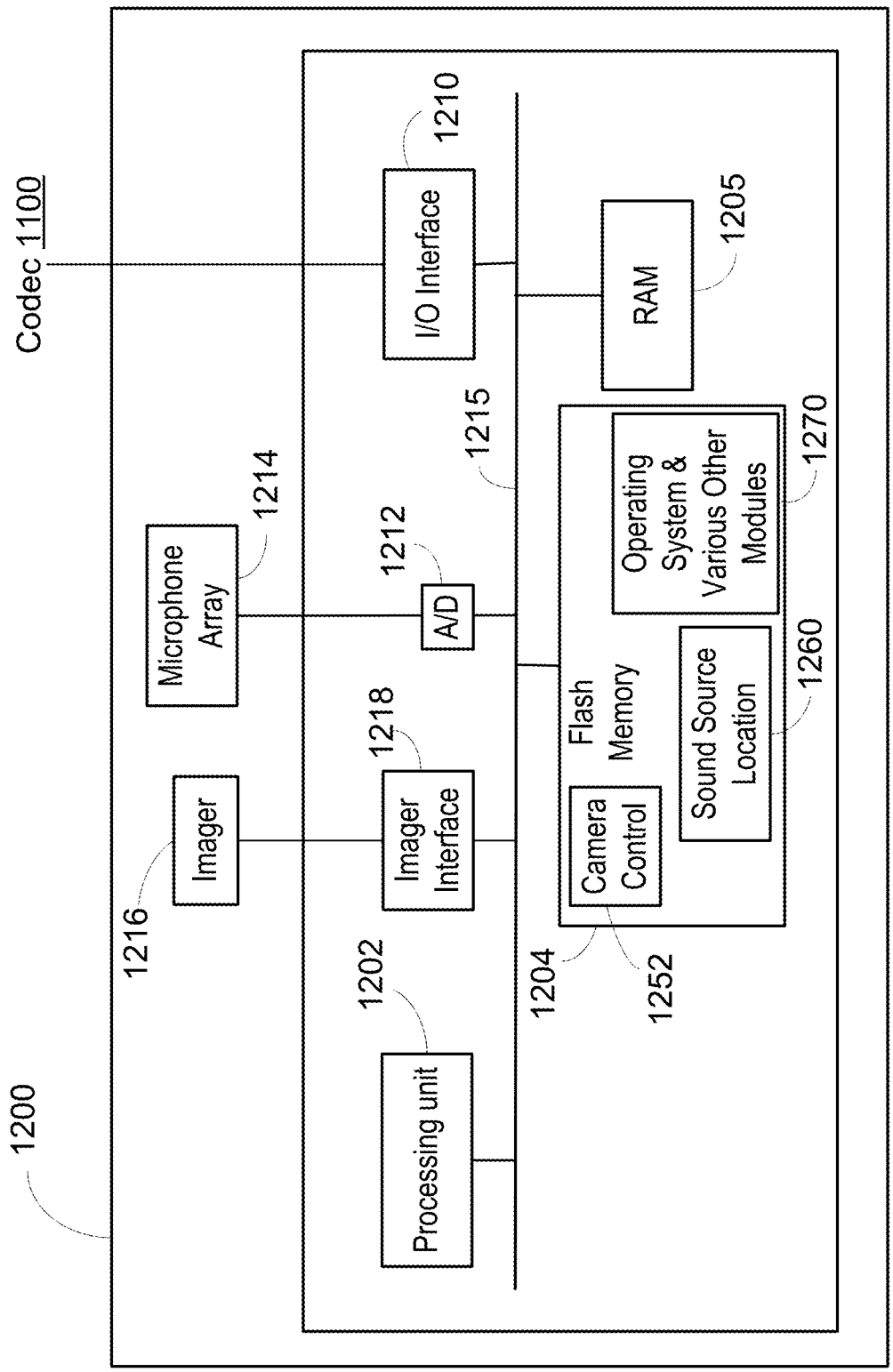
FIG. 12 is a block diagram of a camera according to the present invention.

FIG. 12 illustrates aspects of a camera 1200 that is separate from the codec 1100, in accordance with an example of this disclosure. The camera 1200 includes an imager or sensor 1216 and a microphone array 1214 interfaced via interfaces to a bus 1215, the microphone array 1214 through an analog to digital (A/D) converter 1212 and the imager 1216 through an imager interface 1218. The camera 1200 also includes a processing unit 1202, a flash memory or other non-volatile program storage device 1204, RAM 1205, and an input/output general interface 1210, all coupled by bus 1215. Bus 1215 is illustrative and any interconnect between the elements can used, such as Peripheral Component Interconnect Express (PCIe) links and switches, Universal Serial Bus (USB) links and hubs, and combinations thereof. The codec 1100 is connected to the I/O interface 1210, preferably using a USB interface.

The processing unit 1202 can include digital signal processors (DSPs), central processing units (CPUs), graphics processing units (GPUs), dedicated hardware elements, such as neural network accelerators and hardware codecs, and the like in any desired combination.

The flash memory 1204 stores modules of varying functionality in the form of software and firmware, generically programs, for controlling the camera 1200. Illustrated modules include camera control 1252, sound source localization 1260 and operating system and various other modules 1270. The RAM 1205 is used for storing any of the modules in the flash memory 1204 when the module is executing, storing video images of video streams and audio samples of audio streams and can be used for scratchpad operation of the processing unit 1202.

In a second configuration, only the main camera 1116B includes the microphone array 1214 and the sound source location module 1260. Cameras 1116A, 1116C are then just simple cameras. In a third configuration, the main camera 1116B is built into the codec 1100, so that the processing unit 1202, the flash memory 1204, RAM 1205 and I/O interface 1210 are those of the codec 1100, with the imager interface 1218 and A/D 1212 connected to the bus 1115.

Other configurations, with differing components and arrangement of components, are well known for both videoconferencing endpoints and for devices used in other manners.

Figure 13:
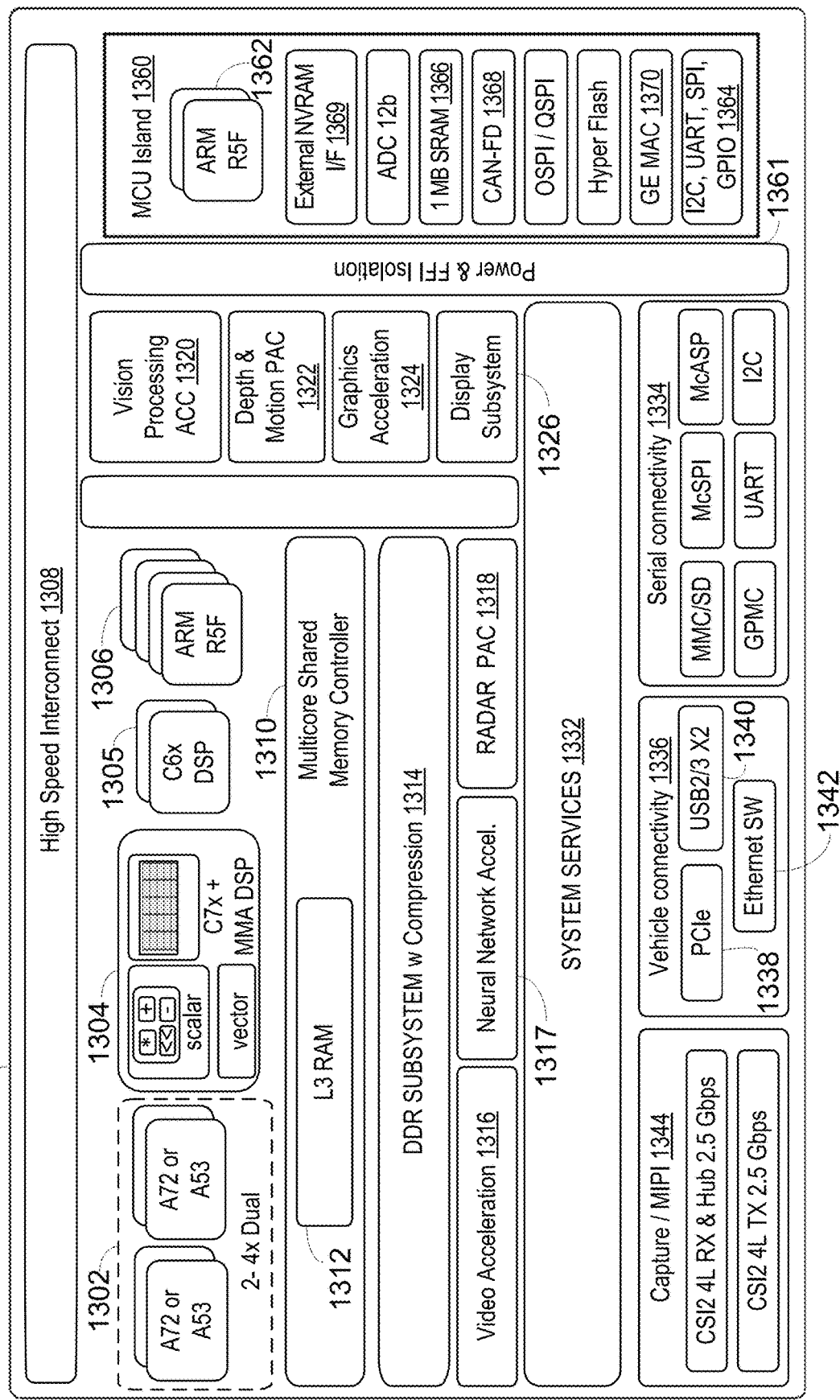
FIG. 13 is a block diagram of the processor units of FIGS. 11 and 12.

FIG. 13 is a block diagram of an exemplary system on a chip (SoC) 1300 as can be used as the processing unit 1102 or 1202. A series of more powerful microprocessors 1302, such as ARM® A72 or A53 cores, form the primary general purpose processing block of the SoC 1300, while a more powerful digital signal processor (DSP) 1304 and multiple less powerful DSPs 1305 provide specialized computing capabilities. A simpler processor 1306, such as ARM R5F cores, provides general control capability in the SoC 1300. The more powerful microprocessors 1302, more powerful DSP 1304, less powerful DSPs 1305 and simpler processor 1306 each include various data and instruction caches, such as L1I, L1D, and L2D, to improve speed of operations. A high-speed interconnect 1308 connects the microprocessors 1302, more powerful DSP 1304, simpler DSPs 1305 and processors 1306 to various other components in the SoC 1300. For example, a shared memory controller 1310, which includes onboard memory or SRAM 1312, is connected to the high-speed interconnect 1308 to act as the onboard SRAM for the SoC 1300. A DDR (double data rate) memory controller system 1314 is connected to the high-speed interconnect 1308 and acts as an external interface to external DRAM memory. The RAM 1105 or 1205 are formed by the SRAM 1312 and external DRAM memory. A video acceleration module 1316 and a radar processing accelerator (PAC) module 1318 are similarly connected to the high speed interconnect 1308. A neural network acceleration module 1317 is provided for hardware acceleration of neural network operations. A vision processing accelerator (VPACC) module 1320 is connected to the high-speed interconnect 1308, as is a depth and motion PAC (DMPAC) module 1322.

A graphics acceleration module 1324 is connected to the high-speed interconnect 1308. A display subsystem 1326 is connected to the high-speed interconnect 1308 to allow operation with and connection to various video monitors. A system services block 1332, which includes items such as DMA controllers, memory management units, general purpose I/O's, mailboxes and the like, is provided for normal SoC 1300 operation. A serial connectivity module 1334 is connected to the high-speed interconnect 1308 and includes modules as normal in an SoC. A vehicle connectivity module 1336 provides interconnects for external communication interfaces, such as PCIe block 1338, USB block 1340 and an Ethernet switch 1342. A capture/MIPI module 1344 includes a four lane CSI 2 compliant transmit block 1346 and a four lane CSI 2 receive module and hub.

An MCU island 1360 is provided as a secondary subsystem and handles operation of the integrated SoC 1300 when the other components are powered down to save energy. An MCU ARM processor 1362, such as one or more ARM R5F cores, operates as a master and is coupled to the high-speed interconnect 1308 through an isolation interface 1361. An MCU general purpose I/O (GPIO) block 1364 operates as a slave. MCU RAM 1366 is provided to act as local memory for the MCU ARM processor 1362. A CAN bus block 1368, an additional external communication interface, is connected to allow operation with a conventional CAN bus environment in a vehicle. An Ethernet MAC (media access control) block 1370 is provided for further connectivity. External memory, generally nonvolatile memory (NVM) such as flash memory 104, is connected to the MCU ARM processor 1362 via an external memory interface 1369 to store instructions loaded into the various other memories for execution by the various appropriate processors. The MCU ARM processor 1362 operates as a safety processor, monitoring operations of the SoC 1300 to ensure proper operation of the SoC 1300.

It is understood that this is one example of an SoC provided for explanation and many other SoC examples are possible, with varying numbers of processors, DSPs, accelerators and the like.

Figure 14:
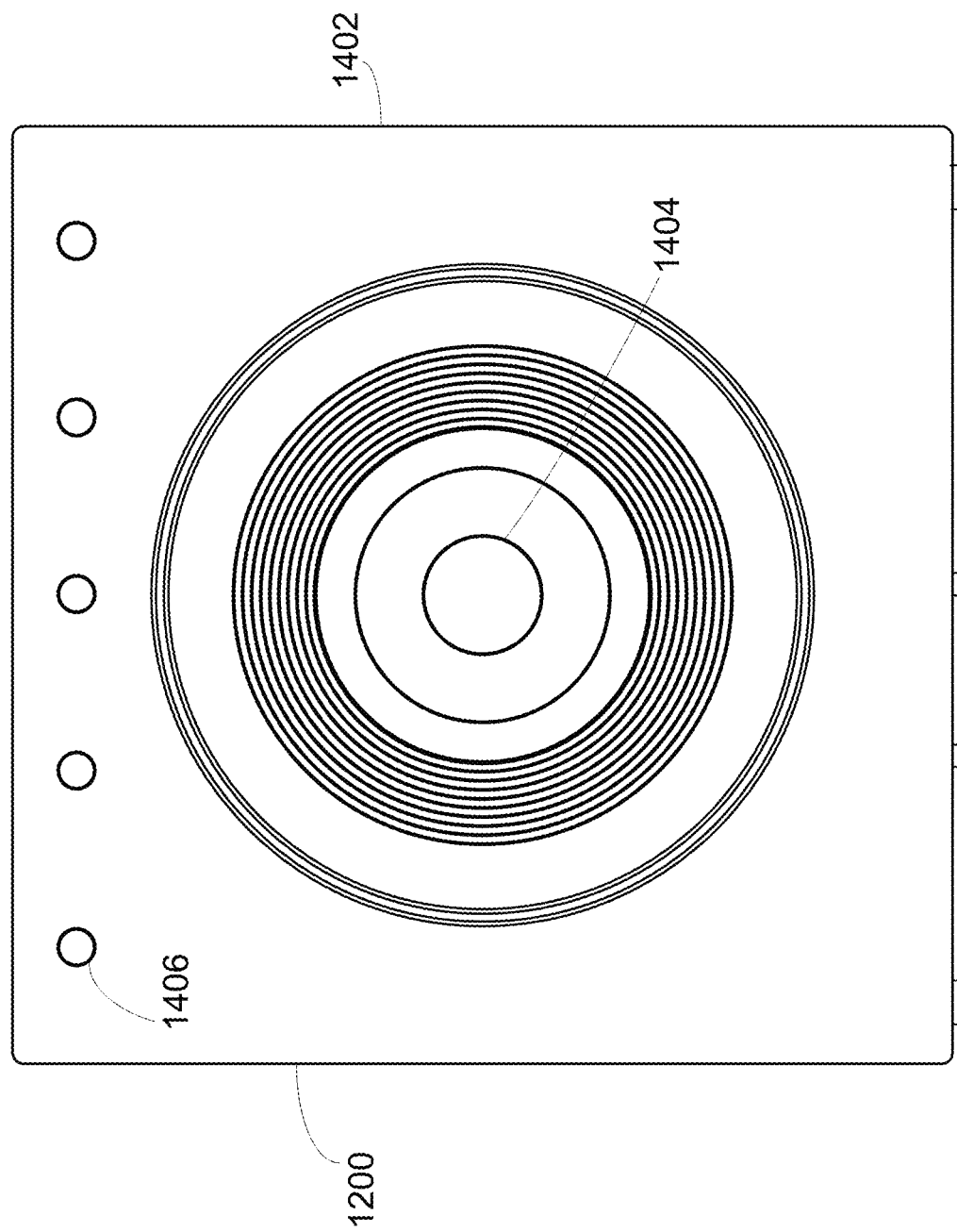
FIG. 14 is an illustration of the front view of a camera according to the present invention.

FIG. 14 provides a front view of a camera 1200, such as the camera 1116B and, optionally, the cameras 1116A and 1116C. The camera 1200 has a housing 1402 with a lens 1404 provided in the center to operate with the imager 1216. A series of five openings 1406 are provided as ports to the microphones in the microphone array 1214. It is noted that the microphone openings 1406 form a horizontal line to provide the desired angular determination for the sound source localization algorithm. This is an exemplary illustration of a camera 1200 and numerous other configurations are possible, with varying lens and microphone configurations.

While the discussion above has focused on transmitting the heads of participants, it is understood that larger portions of the individuals, including shoulders, upper torso and any other desired body portions can be determined, developed and transmitted.

The development of an ROI video frame that includes only ROIs of interest and not other elements and providing the ROI video frames in a single video stream simplifies the development of gallery view continuous presence displays. ROI position and size information metadata can be provided or subpicture concepts of the particular codec can be used to separate the ROIs in the ROI video frame Metadata can provide perspective/distortion correction values, speaker status and any other information desired about the participant or other ROI, such as name. Only a single encoder and a single decoder is needed, simplifying both transmitting and receiving endpoints. Only a single video stream is needed, reducing bandwidth requirements. As each participant can be individually isolated, the participants can be provided in similar sizes and laid out as desired in a continuous presence display that is pleasing to view.

Some examples according to the present invention include a videoconference endpoint that includes a processor. The endpoint also includes a network interface coupled to the processor for connection to a far end videoconference endpoint. The endpoint also includes a camera interface coupled to the processor for receiving at least one video stream of captured images of a conference room containing participants. The endpoint also includes a video output interface coupled to the processor for providing a video stream to a display for presentation. The endpoint also includes memory coupled to the processor for storing instructions executed by the processor, the memory storing instructions executed by the processor to perform various operations. The endpoint also includes detecting regions of interest in the conference room from the at least one video stream of captured images. The endpoint also includes developing transmit individual images of the detected regions of interest. The endpoint also includes combining the transmit individual images into a transmit video frame of an outgoing single video stream. The endpoint also includes providing transmit indications of the locations of the transmit individual images in the transmit video frame. The endpoint also includes encoding and transmitting from the network interface the transmit video frame in the outgoing single video stream and the transmit indications of the locations of the transmit individual images. The endpoint also includes receiving at from the network interface an encoded receive video frame in an incoming single video stream and receive indications of the locations of receive individual images in the encoded receive video frame. The endpoint also includes determining the locations of the receive individual images in the received video frame using the received indications. The endpoint also includes extracting the receive individual images from the received video frame. The endpoint also includes determining a continuous presence layout of the extracted receive individual images and other individual images. The endpoint also includes forming an output video frame of the determined continuous presence layout with the extracted receive individual images and other individual images. The endpoint also includes transmitting the output video frame over the video output interface for display.

Examples may include one or more of the following features. The videoconference endpoint where providing transmit indications of the location of the transmit individual images in the transmit video frame includes providing transmit metadata including transmit indication of the position in the transmit video frame and size of each transmit individual image, and extracting the receive individual images from the receive video frame is performed on a decoded receive video frame. The videoconference endpoint where providing transmit indications of the location of the transmit individual images in the transmit video frame includes encoding the transmit video frame using subpicture techniques appropriate for a video codec protocol used for encoding the transmit video frame; and extracting the receive individual images from the received video frame is performed as part of decoding the received video image. The videoconference endpoint providing transmit metadata including transmit perspective/distortion correction values for transmit individual images in the transmit video frame of the outgoing single video stream; and correcting extracted receive individual images using the receive perspective/distortion correction values before forming the output video frame and using the corrected receive individual images in the output video frame. The videoconference endpoint providing transmit metadata including an indication if an a transmit individual image in the transmit video frame of the outgoing single video stream is a speaker; and determining that an a receive individual image in the received video frame is an the image of a speaker and using such determination in determining the continuous presence layout. The videoconference endpoint developing a transmit video frame of the conference room; encoding and transmitting the encoded transmit conference room video frame in the outgoing single video stream; receiving and decoding an encoded receive conference room video frame in the incoming single video frame stream; and using such decoded receive conference room video frame in determining the continuous presence layout.

One general aspect includes a method of providing a gallery view continuous presence displays in a videoconference. The method of providing also includes detecting regions of interest in a conference room from at least one video stream of captured images of the conference room. The providing also includes developing transmit individual images of the detected regions of interest. The providing also includes combining the transmit individual images into a transmit video frame of an outgoing single video stream. The providing also includes providing transmit indications of the locations of the transmit individual images in the transmit video frame. The providing also includes encoding and transmitting the transmit video frame in the outgoing single video stream and the transmit indications of the locations of the transmit individual images. The providing also includes receiving an encoded receive video frame in an incoming single video stream and receive indications of the locations of receive individual images in the encoded receive video frame. The providing also includes determining locations of receive individual images in the received video frame using the received indications. The providing also includes extracting the receive individual images from the received video frame. The providing also includes determining a continuous presence layout of the extracted receive individual images and other individual images. The providing also includes forming an output video frame of the determined continuous presence layout with the extracted receive individual images and other individual images. The providing also includes transmitting the output video frame over a video output interface for display.

Examples may include one or more of the following features. Providing transmit indications of the location of the transmit individual images in the transmit video frame includes providing transmit metadata including transmit indication of the position in the video frame and size of each transmit individual image, and extracting the receive individual images from the video frame is performed on a decoded video frame. Providing transmit indications of the location of the transmit individual images in the transmit video frame includes encoding the transmit video frame using subpicture techniques appropriate for a video codec protocol used for encoding the transmit video frame; and extracting the receive individual images from the received video frame is performed as part of decoding the received video image. Providing transmit metadata including transmit perspective/distortion correction values for transmit individual images in the transmit video frame of the outgoing single video stream; and correcting extracted receive individual images using the receive perspective/distortion correction values before forming the output video frame and using the corrected receive individual images in the output video frame. The method may include providing transmit metadata including an indication if an a transmit individual image in the transmit video frame of the outgoing single video stream is a speaker; and determining that an a receive individual image in the received video frame is an image of a speaker and using such determination in determining the continuous presence layout. The method may include developing a transmit video frame of the conference room; encoding and transmitting the encoded transmit conference room video frame in the outgoing single video stream; receiving and decoding an encoded receive conference room video frame in the incoming single video stream; and using such decoded receive conference room video frame in determining the continuous presence layout.

One general aspect includes a method of providing individual images for use in a gallery view continuous presence display. The method of providing individual images also includes detecting regions of interest in a conference room from at least one video stream of captured images of the conference room. The method also includes developing transmit individual images of the detected regions of interest. The method also includes combining the transmit individual images into a transmit video frame of an outgoing single video stream. The method also includes providing transmit indications of the locations of the transmit individual images in the transmit video frame. The method also includes encoding and transmitting the transmit video frame in the outgoing single video stream and the transmit indications of the locations of the transmit individual images.

Examples may include one or more of the following features. Providing transmit indications of the location of the transmit individual images in the transmit video frame includes providing transmit metadata including transmit indication of the position in the video frame and size of each transmit individual image. Providing transmit indications of the location of the transmit individual images in the transmit video frame includes encoding the transmit video frame using subpicture techniques appropriate for a video codec protocol used for encoding the transmit video frame. The method may include providing transmit metadata including transmit perspective/distortion correction values for transmit individual images in the transmit video frame of the outgoing single video stream. The method may include providing transmit metadata including an indication if an a transmit individual image in the transmit video frame of the outgoing single video stream is a speaker.

The above description is illustrative and not restrictive. Many variations of the invention will become apparent to those skilled in the art upon review of this disclosure. The scope of the invention should therefore be determined not with reference to the above description, but instead with reference to the appended claims along with their full scope of equivalents.

What is claimed is:

1. A videoconference endpoint comprising:
   a processor;
   a network interface coupled to the processor for connection to a far end videoconference endpoint;
   a camera interface coupled to the processor for receiving at least one video stream of captured images of a conference room containing participants;
   a video output interface coupled to the processor for providing a video stream to a display for presentation; and
   memory coupled to the processor for storing instructions executed by the processor, the memory storing instructions executed by the processor to perform operations of:
      detecting regions of interest in the conference room from the at least one video stream of captured images;
      developing transmit individual images of the detected regions of interest;
      combining the transmit individual images into a transmit video frame of an outgoing single video stream;
      providing transmit indications of locations of the transmit individual images in the transmit video frame;
      providing transmit metadata including one or more correction values for the transmit individual images in the transmit video frame;
      encoding and transmitting from the network interface the transmit video frame in the outgoing single video stream, the transmit indications of the locations of the transmit individual images, and the transmit metadata;
      receiving from the network interface a receive video frame that is encoded in an incoming single video stream and receive indications of locations of receive individual images in the receive video frame;
      determining the locations of the receive individual images in the receive video frame using the receive indications;
      extracting the receive individual images from the receive video frame;
      determining a continuous presence layout of the receive individual images and other individual images;
      forming an output video frame of the continuous presence layout with the receive individual images and the other individual images; and
      transmitting the output video frame over the video output interface for display.

2. The videoconference endpoint of claim 1, wherein:
   the providing the transmit indications of the locations of the transmit individual images in the transmit video frame includes providing a transmit indication of a position in the transmit video frame and a size of each transmit individual image; and
   the extracting the receive individual images from the receive video frame is performed on the receive video frame after being decoded.

3. The videoconference endpoint of claim 1, wherein:
   the providing the transmit indications of the locations of the transmit individual images in the transmit video frame includes encoding the transmit video frame using subpicture techniques appropriate for a video codec protocol used for encoding the transmit video frame; and
   the extracting the receive individual images from the receive video frame is performed as part of decoding the receive video frame.

4. The videoconference endpoint of claim 1, the memory further storing instructions executed by the processor to perform the operations of:
   correcting the receive individual images using the one or more correction values, which indicate perspective or distortion correction values, before forming the output video frame and using the receive individual images that have been corrected in the output video frame.

5. The videoconference endpoint of claim 1, the memory further storing instructions executed by the processor to perform the operations of:
   providing an indication that a transmit individual image in the transmit video frame of the outgoing single video stream depicts a person that is a speaker; and
   determining that a receive individual image in the receive video frame depicts a person that is a speaker and using such determination in the determining the continuous presence layout.

6. The videoconference endpoint of claim 1, the memory further storing instructions executed by the processor to perform the operations of:

developing a transmit video frame of the conference room;

encoding and transmitting the transmit video frame of the conference room in the outgoing single video stream;

receiving and decoding a receive video frame of the conference room in the incoming single video stream; and using the receive video frame of the conference room in the determining the continuous presence layout.

7. A method of providing a gallery view continuous presence display in a videoconference, the method comprising:

detecting regions of interest in a conference room from at least one video stream of captured images of the conference room;

developing transmit individual images of the detected regions of interest;

combining the transmit individual images into a transmit video frame of an outgoing single video stream;

providing transmit indications of locations of the transmit individual images in the transmit video frame;

providing transmit metadata including one or more correction values for the transmit individual images in the transmit video frame;

encoding and transmitting the transmit video frame in the outgoing single video stream, the transmit indications of the locations of the transmit individual images, and the transmit metadata;

receiving a receive video frame that is encoded in an incoming single video stream and receive indications of locations of receive individual images in the receive video frame;

determining the locations of the receive individual images in the receive video frame using the receive indications;

extracting the receive individual images from the receive video frame;

determining a continuous presence layout of the receive individual images and other individual images;

forming an output video frame of the continuous presence layout with the receive individual images and the other individual images; and transmitting the output video frame over a video output interface for display.

8. The method of claim 7, wherein:
the providing the transmit indications of the locations of the transmit individual images in the transmit video frame includes providing a transmit indication of a position in the transmit video frame and a size of each transmit individual image; and
the extracting the receive individual images from the receive video frame is performed on a decoded video frame.

9. The method of claim 7, wherein:
the providing the transmit indications of the locations of the transmit individual images in the transmit video frame includes encoding the transmit video frame using subpicture techniques appropriate for a video codec protocol used for encoding the transmit video frame; and
the extracting the receive individual images from the receive video frame is performed as part of decoding the receive video frame.

10. The method of claim 7, further comprising:
correcting the receive individual images using the one or more correction values, which indicate perspective or distortion correction values, before forming the output video frame and using the receive individual images in the output video frame.

11. The method of claim 7, further comprising:
providing an indication that a transmit individual image in the transmit video frame of the outgoing single video stream depicts a person that is a speaker; and
determining that a receive individual image in the receive video frame depicts a person that is a speaker and using such determination in the determining the continuous presence layout.

12. The method of claim 7, further comprising:
developing a transmit video frame of the conference room;
encoding and transmitting the transmit video frame of the conference room in the outgoing single video stream;
receiving and decoding a receive video frame of the conference room in the incoming single video stream; and
using the receive video frame of the conference room in the determining the continuous presence layout.

13. A method comprising:
detecting regions of interest in a conference room from at least one video stream of captured images of the conference room;
developing transmit individual images of the detected regions of interest;
determining one or more correction values for one or more of the transmit individual images;
combining the transmit individual images into a transmit video frame of an outgoing single video stream;
providing transmit indications of locations of the transmit individual images in the transmit video frame; and
encoding and transmitting the transmit video frame in the outgoing single video stream and the transmit indications of the locations of the transmit individual images.

14. The method of claim 13, wherein:
the providing the transmit indications of the locations of the transmit individual images in the transmit video frame includes providing transmit metadata including a transmit indication of a position in the transmit video frame and a size of each transmit individual image.

15. The method of claim 13, wherein:
the providing the transmit indications of the locations of the transmit individual images in the transmit video frame includes encoding the transmit video frame using subpicture techniques appropriate for a video codec protocol used for encoding the transmit video frame.

16. The method of claim 13, further comprising:
providing transmit metadata including the one or more correction values, which indicate perspective or distortion correction values, for the one or more of the transmit individual images in the transmit video frame of the outgoing single video stream.

17. The method of claim 13, further comprising:
providing transmit metadata including an indication of whether a transmit individual image in the transmit video frame of the outgoing single video stream depicts a person that is a speaker.

18. The method of claim 13, further comprising:
developing a transmit video frame of the conference room; and
encoding and transmitting the transmit video frame of the conference room in the outgoing single video stream.

* * * * *